(12) United States Patent
Miura et al.

(10) Patent No.: US 10,770,759 B2
(45) Date of Patent: Sep. 8, 2020

(54) METHOD OF MANUFACTURING LITHIUM ION SECONDARY BATTERY

(71) Applicant: TOYOTA JIDOSHA KABUSHIKI KAISHA, Toyota-shi, Aichi-ken (JP)

(72) Inventors: Takashi Miura, Toyota (JP); Masanori Kitayoshi, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 765 days.

(21) Appl. No.: 15/208,196

(22) Filed: Jul. 12, 2016

(65) Prior Publication Data

US 2017/0018818 A1    Jan. 19, 2017

(30) Foreign Application Priority Data

Jul. 17, 2015 (JP) ................. 2015-142906
Mar. 18, 2016 (JP) ................. 2016-055918

(51) Int. Cl.

| | |
|---|---|
| *H01M 10/44* | (2006.01) |
| *H01M 10/0525* | (2010.01) |
| *H01M 10/0568* | (2010.01) |
| *H01M 10/0569* | (2010.01) |
| *H01M 10/0587* | (2010.01) |
| *H01M 4/58* | (2010.01) |
| *H01M 4/36* | (2006.01) |
| *H01M 10/0567* | (2010.01) |

(52) U.S. Cl.
CPC ......... *H01M 10/446* (2013.01); *H01M 4/366* (2013.01); *H01M 4/5825* (2013.01); *H01M 10/0525* (2013.01); *H01M 10/0567* (2013.01); *H01M 10/0568* (2013.01); *H01M 10/0569* (2013.01); *H01M 10/0587* (2013.01); *H01M 2300/0034* (2013.01); *Y02T 10/7011* (2013.01)

(58) Field of Classification Search
CPC .......... H01M 10/446; H01M 10/0525; H01M 10/0567; H01M 10/0568; H01M 10/0587; H01M 10/0569; H01M 4/366; H01M 4/5825; H01M 2300/0034
See application file for complete search history.

(56) References Cited

U.S. PATENT DOCUMENTS

| | | | |
|---|---|---|---|
| 2002/0034678 A1 | 3/2002 | Shibuya et al. | |
| 2008/0020283 A1* | 1/2008 | Miyashiro ............ | B82Y 30/00 429/322 |

(Continued)

FOREIGN PATENT DOCUMENTS

| | | |
|---|---|---|
| CN | 1249844 C | 4/2006 |
| CN | 102376948 A | 3/2012 |

(Continued)

*Primary Examiner* — Ula C Ruddock
*Assistant Examiner* — Matthew W Van Oudenaren
(74) *Attorney, Agent, or Firm* — Sughrue Mion, PLLC

(57) ABSTRACT

Provided is a method of manufacturing a lithium ion secondary battery. The method includes a step of initially charging the battery. The step includes: a first step of charging the battery such that a voltage Vt of the battery is increased to a first voltage Vh which is in a lower decomposition range Ad; a second step of holding the voltage Vt of the battery at the first voltage Vh; and a third step of charging the battery to a second voltage Ve, which is higher than the first voltage Vh, after the second step.

11 Claims, 15 Drawing Sheets

(56) References Cited

U.S. PATENT DOCUMENTS

| | | | | |
|---|---|---|---|---|
| 2011/0236751 A1* | 9/2011 | Amiruddin | ......... | H01M 4/0447 |
| | | | | 429/188 |
| 2012/0034503 A1 | 2/2012 | Toyama et al. | | |
| 2015/0140361 A1* | 5/2015 | Abe | .................... | H01M 4/0445 |
| | | | | 429/7 |
| 2015/0180036 A1* | 6/2015 | Takebayashi | ........... | H01M 4/13 |
| | | | | 429/319 |

FOREIGN PATENT DOCUMENTS

| | | | |
|---|---|---|---|
| JP | 2001-325988 A | | 11/2011 |
| JP | 2012-38534 A | | 2/2012 |
| JP | 2014-103098 A | | 6/2014 |
| WO | WO2013171991 | * | 11/2013 |
| WO | WO2014064513 | * | 5/2014 |

* cited by examiner

METHOD OF MANUFACTURING LITHIUM ION SECONDARY BATTERY

INCORPORATION BY REFERENCE

The disclosures of Japanese Patent Applications No. 2015-142906 and No. 2016-055918 filed on Jul. 17, 2015 and Mar. 18, 2016, including the specification, drawings, and abstract of each application, are incorporated herein by reference in their entirety.

BACKGROUND OF THE INVENTION

1. Field of the Invention

The present invention relates to a method of manufacturing a lithium ion secondary battery, the lithium ion secondary battery including: a positive electrode that includes a positive electrode active material layer containing positive electrode active material particles; a negative electrode; and a nonaqueous electrolytic solution that contains a compound containing fluorine.

2. Description of Related Art

It is known that, in a lithium ion secondary battery (hereinafter, referred to simply as "battery"), the positive electrode potential is high; therefore, a nonaqueous solvent of a nonaqueous electrolytic solution is likely to be oxidized and decomposed on particle surfaces of positive electrode active material particles. In a case where the nonaqueous electrolytic solution contains a compound containing fluorine, hydrogen ions, which are produced by the oxidative decomposition of the nonaqueous solvent, may react with fluorine to produce hydrofluoric acid (HF). As a result, due to the action of the hydrofluoric acid, a metal element such as a transition metal is eluted from the positive electrode active material particles, and the battery capacity decreases. Therefore, this battery has a problem in that the battery capacity significantly decreases in a charging-discharging cycle test.

In order to solve the problem, a technique of adding particles of a metal phosphate such as lithium phosphate or a metal pyrophosphate to the positive electrode active material layer in advance is known. When metal phosphate particles are added to the positive electrode active material layer, the above-described hydrofluoric acid reacts with a metal phosphate during the initial charging of the battery, and a film containing fluorine and phosphorus is formed on particle surfaces of the positive electrode active material particles. This film prevents direct contact between the nonaqueous electrolytic solution and the positive electrode active material. Therefore, even when the positive electrode potential exceeds an oxidative decomposition potential of the nonaqueous solvent after the formation of the film, the oxidative decomposition of the nonaqueous solvent can be prevented. Accordingly, after the charging-discharging cycle test is performed on the battery, a decrease in battery capacity can be reduced. For example, Japanese Patent Application Publication No. 2014-103098 (JP 2014-103098 A) discloses a technique of adding particles of a metal phosphate such as lithium phosphate or sodium phosphate to a positive electrode mixture layer (positive electrode active material layer).

However, it was found that, when the charge current increases during the initial charging of a battery, the battery resistance tends to increase. The film containing fluorine and phosphorus is a resistor. However, it is presumed that, when the charge current is high during the formation of the film, the oxidative decomposition of a nonaqueous electrolytic solution excessively occurs, and the thickness of the film increases; therefore, the electric resistance increases.

SUMMARY OF THE INVENTION

The invention provides a method of manufacturing a lithium ion secondary battery, in which, in a step of initially charging a battery (initial charging step), the battery resistance can be reduced while forming a film containing fluorine and phosphorus on particle surfaces of positive electrode active material particles.

According to a first aspect of the invention, there is provided a method of manufacturing a lithium ion secondary battery. The lithium ion secondary battery includes: a positive electrode that includes a positive electrode active material layer containing positive electrode active material particles; a negative electrode; and a nonaqueous electrolytic solution that contains a compound containing fluorine. The positive electrode active material particles have a surface on which a film containing fluorine and phosphorus is formed. The positive electrode active material layer includes particles of at least one of a metal phosphate and a metal pyrophosphate. The method includes a step of initially charging the lithium ion secondary battery. The step includes: a first step of charging the lithium ion secondary battery such that a voltage of the lithium ion secondary battery is increased to a first voltage which is in a lower decomposition range of the nonaqueous electrolytic solution; a second step of holding the voltage of the lithium ion secondary battery at the first voltage; and a third step of charging the lithium ion secondary battery to a second voltage, which is higher than the first voltage, after the second step.

According to the first aspect of the invention, the initial charging step is performed as follows. After the first step, in the second step, the battery voltage (inter-terminal voltage) is held at the first voltage, which is in the lower decomposition range. That is, constant-voltage charging (hereinafter, referred to as "CV charging") is performed at the first voltage. Next, the lithium ion secondary battery is charged to the second voltage in the third step. Therefore, in the second step, the nonaqueous electrolytic solution is oxidized and decomposed while holding the battery voltage at the first voltage. However, the first voltage is in a low voltage range of the lower decomposition range although it is in a range where the nonaqueous electrolytic solution is oxidized and decomposed. Therefore, the nonaqueous electrolytic solution is slowly oxidized and decomposed, the thickness of the film containing fluorine and phosphorus formed on the particle surfaces of the positive electrode active material particles can be made thin, and the battery resistance can be reduced to be low.

Once the film is appropriately formed on the surface of each of the positive electrode active material particles, the oxidative decomposition of the nonaqueous electrolytic solution can be prevented even when the battery voltage is in a range where the nonaqueous electrolytic solution is oxidized and decomposed. The reason for this is presumed to be that the formed film prevents contact between the positive electrode active material particles and the nonaqueous electrolytic solution.

"The lower decomposition range" of the nonaqueous electrolytic solution refers to a voltage range of a decomposition lower limit voltage, which is the lower limit voltage where the nonaqueous electrolytic solution is oxidized and decomposed, to a voltage which is higher than the decomposition lower limit voltage by 0.4 V in the battery. For example, in a case where the decomposition lower limit voltage is 4.0 V, "the lower decomposition range" is 4.0 V to 4.4 V. The reason for this is that, in a case where the voltage is held in this range, the oxidative decomposition of the nonaqueous electrolytic solution does not become excessive. "The decomposition lower limit voltage" of the nonaqueous electrolytic solution is a value obtained by subtracting the negative electrode potential (for example, in a negative electrode using graphite particles, 0.2 V (vs. Li/Li+)) from "the decomposition lower limit potential (vs. Li/Li+) of the nonaqueous electrolytic solution. Further, "the decomposition lower limit potential (vs. Li/Li+) of the nonaqueous electrolytic solution is a value detected using the following method. A measurement cell, which includes a working electrode formed of a Pt plate, a counter electrode formed of lithium metal, a reference electrode, and the nonaqueous electrolytic solution used in the battery as an electrolytic solution, is prepared. Using an electrochemical measurement system (for example, manufactured by Solatron, Inc.), CV measurement of increasing and decreasing the potential of the working electrode of the measurement cell in a range of 3.0 V to 5.4 V (vs. Li/Li+) at a rate of 1 mV/sec is performed in two cycles. Further, when the potential of the working electrode is increased in a third cycle, a relationship between the positive electrode potential Ep (V (vs. Li/Li+)) and a current I ($\mu$A/cm$^2$) flowing at this time is acquired. Based on the relationship, a relationship (graph) between the positive electrode potential Ep (V (vs. Li/Li+)) and a differential value dI/dEp is acquired. An approximation straight line is drawn to overlap a portion where the differential value dI/dEp linearly increases. On the approximation straight line, a value of the positive electrode potential Ep at which the differential value dI/dEp is 0 is set as "decomposition lower limit potential (vs. Li/Li+)" Epd of the nonaqueous electrolytic solution (refer to FIGS. 6 and 7).

Examples of the composition of the particles of the metal phosphate, which is contained in the positive electrode active material layer, include a phosphate of alkali metal represented by $M_3PO_4$ (M represents alkali metal), a phosphate of a Group 2 element represented by $M_3(PO_4)_2$ (M represents a Group 2 element), and a phosphate including both alkali metal and a Group 2 metal. Further, examples of the phosphate of alkali metal include lithium phosphate ($Li_3PO_4$), sodium phosphate ($Na_3PO_4$), potassium phosphate ($K_3PO_4$), and dilithium sodium phosphate ($Li_2NaPO_4$). Examples of the phosphate of a Group 2 element include magnesium phosphate ($Mg_3(PO_4)_2$) and calcium phosphate ($Ca_3(PO_4)_2$). Examples of the phosphate including both alkali metal and a Group 2 metal include sodium magnesium phosphate ($MgNaPO_4$). Further, examples of the metal phosphate include a metal phosphate including an element other than alkali metal and a Group 2 element, for example, lithium aluminum germanium phosphate (LAGP: $Li_{1.5}Al_{0.5}Ge_{1.5}(PO_4)_3$).

Examples of the composition of the particles of the metal pyrophosphate include a pyrophosphate of alkali metal represented by $M_4P_2O_7$ (M represents alkali metal) and a pyrophosphate of a Group 2 element represented by $M_2P_2O_7$ (M represents a Group 2 element). Further, examples of the pyrophosphate of alkali metal include lithium pyrophosphate ($Li_4P_2O_7$), sodium pyrophosphate ($Na_4P_2O_7$), and potassium pyrophosphate ($K_4P_2O_7$). Examples of the pyrophosphate of a Group 2 element include magnesium pyrophosphate ($Mg_2P_2O_7$) and calcium pyrophosphate ($Ca_2P_2O_7$).

As the positive electrode active material which form "positive electrode active material particles", for example, a lithium transition metal composite oxide may be used. Examples of the lithium transition metal composite oxide include lithium nickel cobalt manganese composite oxide containing nickel (Ni), cobalt (Co), and manganese (Mn) as a transition metal, lithium nickel manganese composite oxide containing nickel and manganese as a transition metal, lithium nickel oxide ($LiNiO_2$), lithium cobalt oxide ($LiCoO_2$), and lithium manganese oxide ($LiMn_2O_4$).

Further, specifically, as the positive electrode active material, a lithium nickel manganese composite oxide having a spinel-type crystal structure represented by the following formula (1) can be used.

$$Li(Ni_xM_yMn_{2-x-y})O_4 \qquad (1)$$

In the formula (1), x satisfies x>0 and preferably 0.2≤x≤1.0.

y satisfies y≥0 and preferably 0≤y<1.0.

x+y<2.0 is satisfied.

"M" may be an arbitrary transition metal element other than Ni and Mn (for example, one element or two or more elements selected from Fe, Co, Cu, and Cr), or a typical metal element (for example, one element or two or more elements selected from Zn and Al).

Whether or not the crystal structure of the positive electrode active material has a spinel structure can be determined using, for example, X-ray structure analysis (preferably, single crystal X-ray structure analysis). Specifically, the determination can be made using X-ray diffraction measurement in which CuKα rays are used.

In addition to fluorine and phosphorus, "the film containing fluorine and phosphorus" may contain decomposition products of components (for example, an electrolyte, a nonaqueous solvent, and an additive) of the nonaqueous electrolytic solution. In addition to the positive electrode active material particles and the particles of at least one of the metal phosphate and the metal pyrophosphate, "the positive electrode active material layer" may contain: a conductive material such as graphite, carbon black, or acetylene black; and a binder such as polyvinylidene fluoride (PVDF), polytetrafluoroethylene (PTFE), or styrene-butadiene rubber (SBR). For example, "negative electrode" may adopt a configuration in which a negative electrode active material layer including negative electrode active material particles is provided on a negative electrode current collector foil. Examples of the negative electrode active material particle include particles which are formed of a carbon material, such as graphite, capable of intercalating and deintercalating lithium.

Examples of the nonaqueous solvent of "the nonaqueous electrolytic solution" include organic solvents such as dimethyl carbonate, diethyl carbonate, ethyl methyl carbonate, methyl propyl carbonate, ethylene carbonate, propylene carbonate, butylene carbonate, and vinylene carbonate. Among these, one kind may be used, or a mixture of two or more kinds may be used. For example, fluoroethylene carbonate or 2,2,2-trifluoroethyl methyl carbonate, which is a nonaqueous solvent containing fluorine, can also be used. Examples of the electrolyte (supporting electrolyte), which is added to "nonaqueous electrolytic solution", include $LiPF_6$, $LiBF_4$, $LiAsF_6$, $LiSbF_6$, and $LiCF_3SO_3$ which are supporting electrolytes containing fluorine. Among these, one kind may be used, or a combination of two or more kinds may be used.

"The nonaqueous electrolytic solution" may also contain additives other than the above-described electrolytes. Examples of the additives include a fluoride and lithium bis(oxalato)borate (LiBOB). Examples of the fluoride include AgF, $CoF_2$, $CoF_3$, CuF, $CuF_2$, $FeF_2$, $FeF_3$, LiF, $MnF_2$, $MnF_3$, $SnF_2$, $SnF_4$, $TiF_3$, $TiF_4$, and $ZrF_4$. Among these, one kind may be used, or a combination of two or more kinds may be used. "The compound containing fluorine" contained in the nonaqueous electrolytic solution may be an electrolyte containing fluorine such as $LiPF_6$, may be an additive containing fluorine such as LiF, or may be a nonaqueous solvent containing fluorine such as fluoroethylene carbonate. As the compound containing fluorine which is contained in the nonaqueous electrolytic solution, one kind may be used alone, or a combination of two or more kinds may be used. A charge current of 1 C refers to a charge current value at which the battery can be charged to a rated capacity for 1 hour.

In the first step, the battery can be charged by constant-current charging (hereinafter, also referred to as "CC charging) or constant-power charging. Alternatively, by constant-voltage charging (CV charging) in which the pre-set voltage is the first voltage or higher, the battery can be charged until the battery voltage reaches the first voltage. In the second step, the battery is charged by constant-voltage charging while holding the first voltage. In the third step, the battery can be charged by constant-current charging or constant-power charging. Alternatively, by constant-voltage charging in which the pre-set voltage is higher than the second voltage, the battery can be charged until the battery voltage reaches the second voltage.

In the above-described method of manufacturing a lithium ion secondary battery, in the third step, the lithium ion secondary battery may be charged at a charge current which is higher than 1 C. In the third step, the battery can be charged by constant-current charging in which the charge current is set as a value of higher than 1 C or by constant-power charging in which the charge current is limited to a value of higher than 1 C.

In the above-described method of manufacturing a lithium ion secondary battery, in the second step, the voltage of the lithium ion secondary battery may be held at the first voltage for a predetermined holding period.

In this manufacturing method, in the second step, the battery voltage is held at the first voltage for the predetermined holding period. Therefore, a film corresponding to the holding period can be reliably formed on the particle surfaces of the positive electrode active material particles.

In the above-described method of manufacturing a lithium ion secondary battery, the holding period may satisfy $Rn=0.98Re$ to $1.02Re$, in which Rn represents a battery resistance of a battery manufactured by performing the second step without extending the holding period and then performing the third step, and Re represents a battery resistance of a holding period extended battery manufactured by holding the first voltage not for the holding period but for an extended holding period, which is 1.5 times the holding period, and performing the third step.

As the holding period increases, that is, as the formation of the film containing fluorine and phosphorus on the particle surfaces of the positive electrode active material particles progresses, the battery resistance decreases after initial charging. However, a decrease in resistance is stopped, and even when the holding period increases, the battery resistance does not change. In this case, the battery resistance Rn satisfying $0.98Re$ to $1.02Re$ represents the following. By holding the first voltage for the holding period (for example, 40 minutes), the film containing fluorine and phosphorus is substantially formed on the particle surface of each of the positive electrode active material particles, and thus substantially no film is formed even when the holding period extends to 1.5 times (for example, 60 minutes). That is, when the first voltage is held for the holding period, the battery resistance Rn varies within 2% at most as compared to the battery resistance Re of the holding period extended battery, and thus the film is sufficiently formed. Accordingly, when the first voltage is held for the holding period, the process can rapidly proceed to the following third step in a state where the formation of the film containing fluorine and phosphorus is substantially completed. That is, a battery having a low battery resistance can be manufactured, in which a thin film, which can prevent the oxidative decomposition of the nonaqueous solvent, is appropriately formed on the particle surfaces of the positive electrode active material particles.

Alternatively, in the above-described method of manufacturing a lithium ion secondary battery, the holding period may satisfy $Rn=0.99Re$ to $1.01Re$, in which Rn represents a battery resistance of a battery manufactured by performing the second step without extending the holding period and then performing the third step, and Re represents a battery resistance of an extended holding battery manufactured by holding the first voltage not for the holding period but for an extended holding period, which is 1.5 times the holding period, and performing the third step.

In this manufacturing method, when the first voltage is held for the holding period, the battery resistance Rn varies within 1% at most as compared to the battery resistance Re of the holding period extended battery, and thus the film is sufficiently formed. Accordingly, when the first voltage is held for the holding period, the process can rapidly proceed to the following third step in a state where the formation of the film containing fluorine and phosphorus is substantially completed. That is, a battery can be manufactured, in which the film is more appropriately formed on the particle surfaces of the positive electrode active material particles.

In the above-described method of manufacturing a lithium ion secondary battery, in the second step, the first voltage may be held until a charge current of the lithium ion secondary battery is a predetermined cut-off current value or lower.

In the second step, the battery voltage is held at the first voltage. However, due to a variation in batteries, the speed of forming a film on surfaces of positive electrode active material particles varies. Therefore, in a case where the period of holding the first voltage is the same, for example, the thickness of a film formed on particle surfaces of positive electrode active material particles varies, and a variation may be generated, for example, in battery resistance. Therefore, in order to obtain a film having an appropriate thickness for all the batteries, it is necessary that the holding period is set to be long according to that of a battery in which the film forming rate is low, and the holding period may be excessively long for some batteries. On the other hand, in the above-described manufacturing method, in the second step, the first voltage is held, not for the predetermined holding period, until the charge current reaches the cut-off current value or lower. Therefore, even when there is a variation in batteries, a film having the same thickness can be formed on particle surfaces of positive electrode active material particles of each of the batteries within a short period of time.

In the above-described method of manufacturing a lithium ion secondary battery, the cut-off current value may be $\frac{2}{5}$ of an end current value at an end stage of the first step.

When the battery voltage is increased to the first voltage in the first step (for example, by CC charging at a predetermined current) and then is held at the first voltage in the second step, that is, is charged by CV charging, first, the charge current flowing through the battery rapidly decreases from the end current value at the end stage of the first step and then gradually decreases. Next, the charge current draws a curve which approaches 0 (in a shape similar to a graph expressed by y=1−ex). At the beginning of the second step, by holding the battery voltage at the first voltage, the electrolytic solution is continuously oxidized and decomposed, and a high current flows as a decomposition current. However, it is presumed that the metal phosphate and the like contained in the positive electrode active material layer are consumed over time, the film is formed, and the oxidative decomposition of the electrolytic solution is prevented; as a result, the charge current gradually decreases.

Based on the above result, as described above, the cut-off current value in the second step is set to be ⅖ of the end current value. As a result, most of the film containing fluorine and phosphorus, which is formed on the particle surfaces of the positive electrode active material particles, can be formed in the second step, and a high-quality film can be formed on the particle surfaces of the positive electrode active material particles while performing the second step within a very short period of time. In addition, the battery resistance can be reduced (specifically, for example, by about 7%) as compared to a case where the second step is not provided.

In the above-described method of manufacturing a lithium ion secondary battery, the cut-off current value may be ⅕ of an end current value at an end stage of the first step.

As described above, the cut-off current value in the second step is set to be ⅕ of the end current value. As a result, most of the film containing fluorine and phosphorus, which is formed on the particle surfaces of the positive electrode active material particles, can be formed in the second step, and a high-quality film can be formed on the particle surfaces of the positive electrode active material particles while performing the second step within a short period of time. In addition, the battery resistance can be reduced (specifically, for example, by about 10%) as compared to a case where the second step is not provided.

Alternatively, in the above-described method of manufacturing a lithium ion secondary battery, an end current value at an end stage of the first step may be 1 C or higher, and the cut-off current value may be 0.05 C.

In the above-described manufacturing method, the end current value of the first step is 1 C or higher, whereas the second step is performed until the cut-off current value is 0.05 C which is sufficiently lower than the end current value. In this way, by performing the second step until the cut-off current value is 0.05 C, the battery resistance is substantially the same as that in a case where the cut-off current value is further reduced from 0.05 C (for example, in a case where the cut-off current value is 0.02 C). That is, even when the cut-off current value is further reduced from 0.05 C, the time of the second step increases, whereas a decrease in battery resistance cannot be expected. The reason for this is presumed to be that, during the formation of the film, substantially the total amount of the metal phosphate (or the metal pyrophosphate) contained in the positive electrode active material layer are consumed in a stage where the charge current is 0.05 C. In this way, by setting the cut-off current value as 0.05 C, substantially the total amount of the film containing fluorine and phosphorus can be formed on the particle surfaces of the positive electrode active material particles in the second step within a short period of time. In addition, a high-quality film can be formed, and the battery resistance can be reduced (specifically, for example, by about 15%) as compared to a case where the second step is not provided.

Further, in any one of the above-described methods of manufacturing a lithium ion secondary battery, the particles of at least one of the metal phosphate and the metal pyrophosphate contained in the positive electrode active material layer may have an average particle size of 1.5 μm or less.

In this manufacturing method, the particles of, for example, a metal phosphate such as lithium phosphate contained in the positive electrode active material layer has an average particle size of 1.5 μm or less. Therefore, assuming that the addition amount is the same, the number or total surface area of particles increases. As a result, a reaction with the produced hydrogen fluoride (hydrofluoric acid) is likely to occur, and a film can be formed within a short period of time, and the time required for the second step, consequently, the time required for the initial charging step can be reduced.

In any one of the above-described methods of manufacturing a lithium ion secondary battery, the positive electrode potential may be 4.5 V (vs. Li/Li+) or higher in at least a portion of an operating range (SOC=0% to 100%) of the lithium ion secondary battery.

In the lithium ion secondary battery according to this manufacturing method, the positive electrode potential is 4.5 V (vs. Li/Li+) or higher in at least a portion of a SOC range of 0% to 100%. Therefore, the nonaqueous electrolytic solution (nonaqueous solvent) is likely to be oxidized and decomposed to produce hydrogen ions on the particle surfaces of the positive electrode active material particles. Further, as described above, the nonaqueous electrolytic solution contains a compound containing fluorine. Therefore, hydrofluoric acid is produced from the hydrogen ions and fluorine. However, in the method of manufacturing a lithium ion secondary battery, as described above, the film containing fluorine and phosphorus is formed on the particle surfaces of the positive electrode active material particles in the initial charging step (second step). Therefore, after the initial charging step, the oxidative decomposition of the nonaqueous electrolytic solution (nonaqueous solvent) can be prevented.

Further, in any one of the above-described methods of manufacturing a lithium ion secondary battery, in the first step and the third step, the lithium ion secondary battery may be charged by constant-current charging at a predetermined current value of 3 C or higher.

In this manufacturing method, in the first step and the third step, the lithium ion secondary battery is charged by CC charging at a current value of 3 C or higher. As a result, the time required for the first step can be reduced, and the step of initially charging the battery (initial charging step) can be performed within a shorter period of time.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
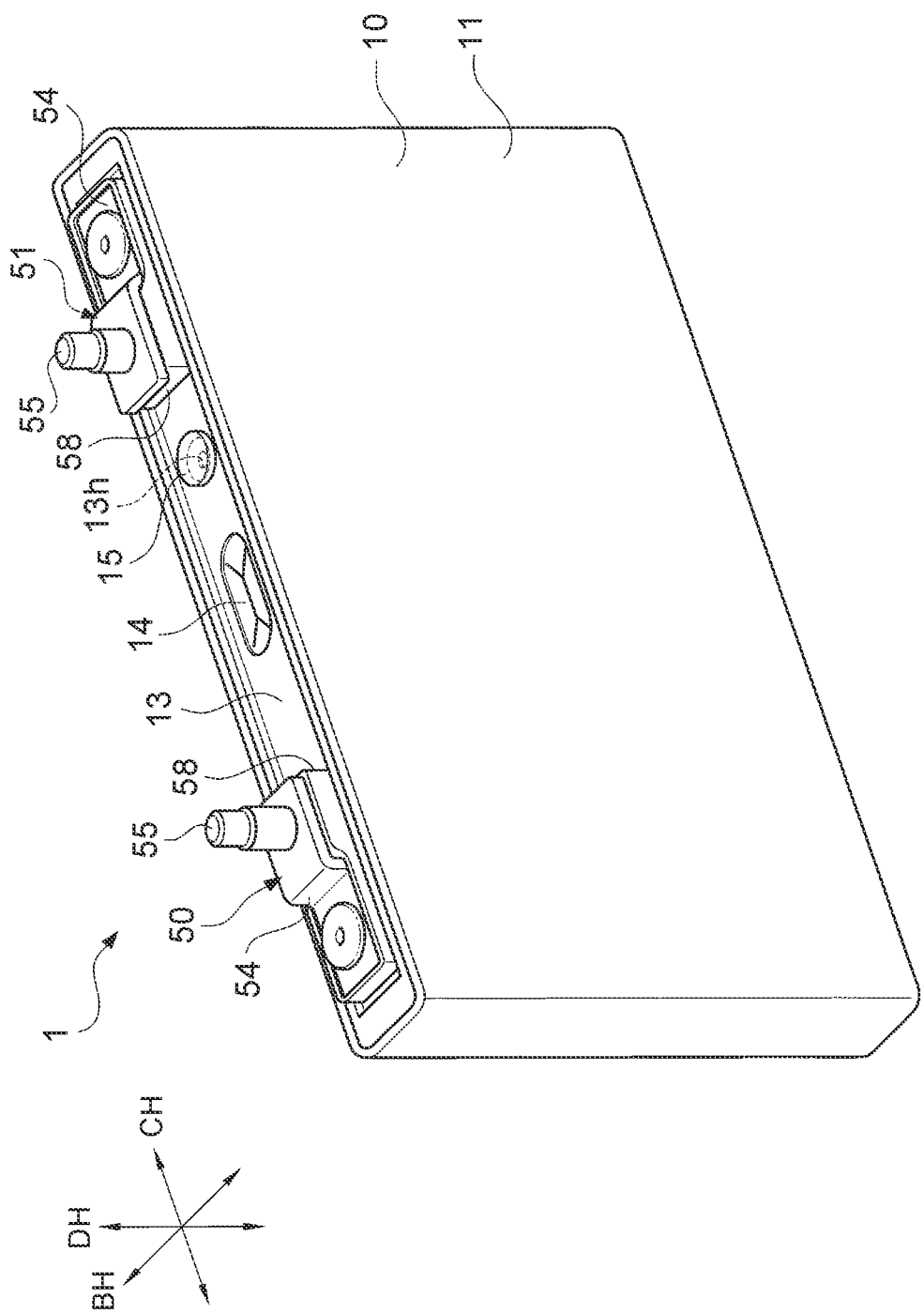
FIG. 1 is a perspective view showing a lithium ion secondary battery according to a first embodiment, a second embodiment, and a modification embodiment.
Figure 2:
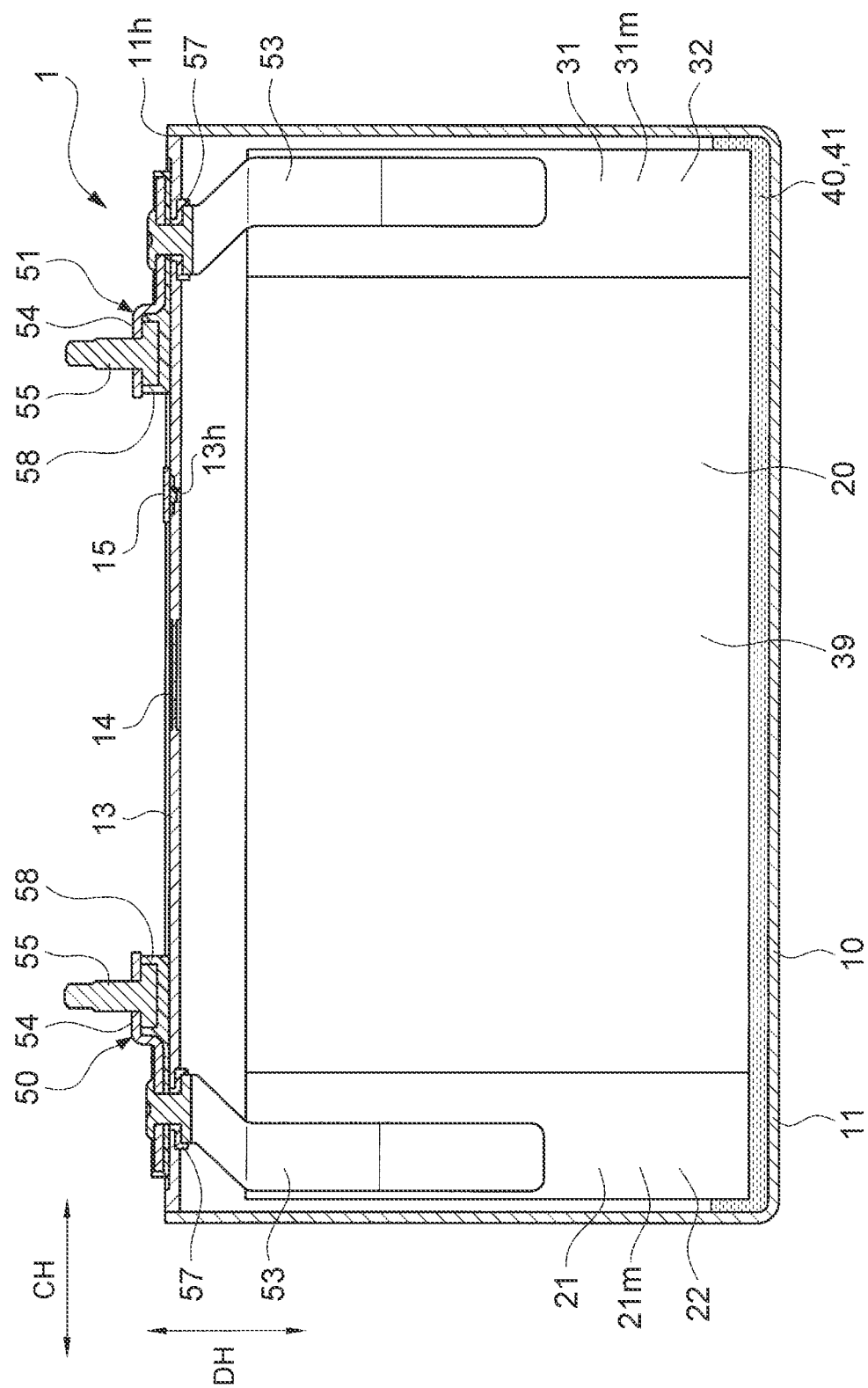
FIG. 2 is a longitudinal sectional view showing the lithium ion secondary battery according to the first embodiment, the second embodiment, and the modification embodiment when being cut in a plan view along a horizontal direction and a vertical direction of the battery.
Figure 3:
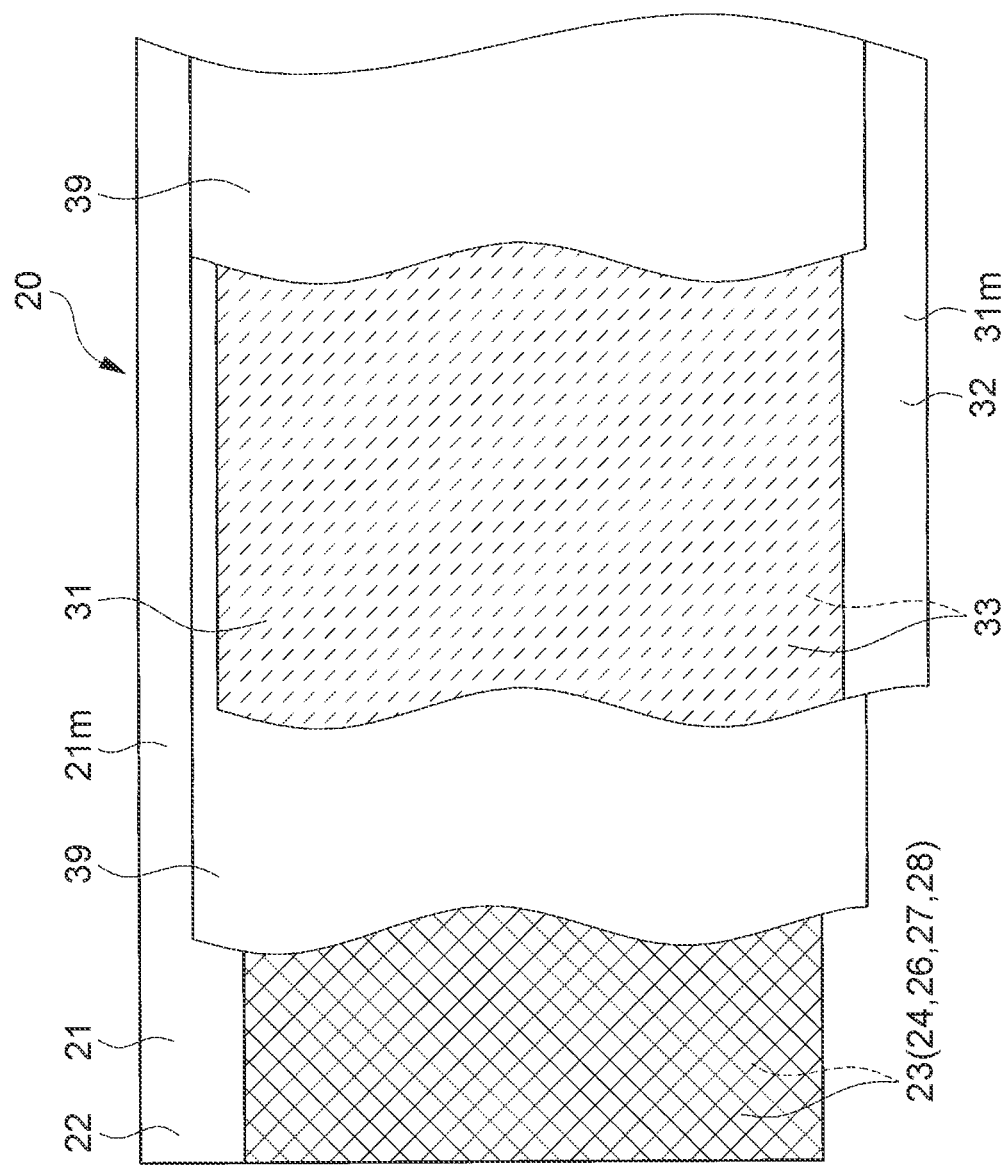
FIG. 3 is an exploded view of an electrode body showing a state where a positive electrode sheet and a negative electrode sheet are laminated with separators interposed therebetween in the first embodiment, the second embodiment, and the modification embodiment.

Hereinafter, a first embodiment of the invention will be described with reference to the drawings. FIGS. 1 and 2 show a lithium ion secondary battery (hereinafter, also referred to as simply "battery") 1 according to the embodiment. FIG. 3 is an exploded view of an electrode body 20 constituting the battery 1. In the following description, in FIGS. 1 and 2, a thickness direction of the battery 1 is represented by BH, a horizontal direction of the battery 1 is represented by CH, and a vertical direction of the battery 1 is represented by DH. This battery 1 is a square closed lithium ion secondary battery which is mounted on a vehicle such as a hybrid vehicle or an electric vehicle. The battery 1 includes: a battery case 10; the electrode body 20 and a nonaqueous electrolytic solution 40 that are accommodated in the battery case 10; and a positive electrode terminal 50 and a negative electrode terminal 51 that are supported on the battery case 10. This battery 1 operates in an inter-terminal voltage Vt of 3.5 V to 4.9 V (SOC=0% to 100%) between the positive electrode terminal 50 and the negative electrode terminal 51. In a SOC range of 0% to 100%, the positive electrode potential Ep varies in a range of 3.7 V to 5.0 V (vs. Li/Li+), and the negative electrode potential En varies in a range of 0.2 V to 0.1 V (vs. Li/Li+).

The battery case 10 has a cuboid shape and is formed of metal (in the embodiment, aluminum). This battery case 10 includes: a cuboid box-shaped case body 11 having an opening 11h only at an upper end; and a rectangular plate-shaped case lid 13 that is welded to the case body 11 such that the opening 11h is closed. In the case lid 13, a safety valve 14 is provided so as to be released when the internal pressure of the battery case 10 reaches a predetermined value. In the case lid 13, a liquid injection hole 13h, which connects the inside and outside of the battery case 10, is formed and is air-tightly sealed with a sealing member 15.

Each of the positive electrode terminal 50 and the negative electrode terminal 51 includes an internal terminal member 53, an external terminal member 54, and a bolt 55 and is fixed to the case lid 13 through an internal insulating member 57 and an external insulating member 58 which are formed of a resin. The positive electrode terminal 50 is formed of aluminum, and the negative electrode terminal 51 is formed of copper. In the battery case 10, the positive electrode terminal 50 is electrically connected to a positive electrode current collector portion 21m of the positive electrode sheet 21 in the electrode body 20 described below. The negative electrode terminal 51 is electrically connected to a negative electrode current collector portion 31m of the negative electrode sheet 31 in the electrode body 20.

Next, the electrode body 20 will be described (refer to FIGS. 2 and 3). The electrode body 20 has a flat shape and is accommodated in the battery case 10. The electrode body 20 is obtained by laminating the belt-shaped positive electrode sheet 21 and the belt-shaped negative electrode sheet 31 with a pair of belt-shaped separators 39 to obtain a laminate, winding the laminate to obtain a wound body, and pressing the wound body into a flat shape.

In the positive electrode sheet 21, a positive electrode active material layer 23 having a belt shape is provided in a region in a width direction on both main surfaces of a positive electrode current collector foil 22 which is a belt-shaped aluminum foil, the region extending along a longitudinal direction. The positive electrode active material layer 23 contains positive electrode active material particles 24, a conductive material (conductive additive) 26, a binder 27, and lithium phosphate particles (metal phosphate particles) 28 described below. In the embodiment, acetylene black (AB) is used as the conductive material 26, polyvinylidene fluoride (PVDF) is used as the binder 27, and lithium phosphate ($Li_3PO_4$) particles (powder) are used as the metal phosphate particles 28.

A mixing ratio of the positive electrode active material particles 24, the conductive material 26, and the binder 27 is 89:8:3 by weight. A mixing ratio of the metal phosphate particles 28 is 3 parts by weight with respect to the positive electrode active material particles 24 (100 parts by weight). In one end portion of the positive electrode current collector foil 22 in the width direction, the positive electrode current collector portion 21m is provided in which the positive electrode current collector foil 22 is exposed without the positive electrode active material layer 23 being present in the thickness direction. The positive electrode terminal 50 is welded to the positive electrode current collector portion 21m.

Figure 4:
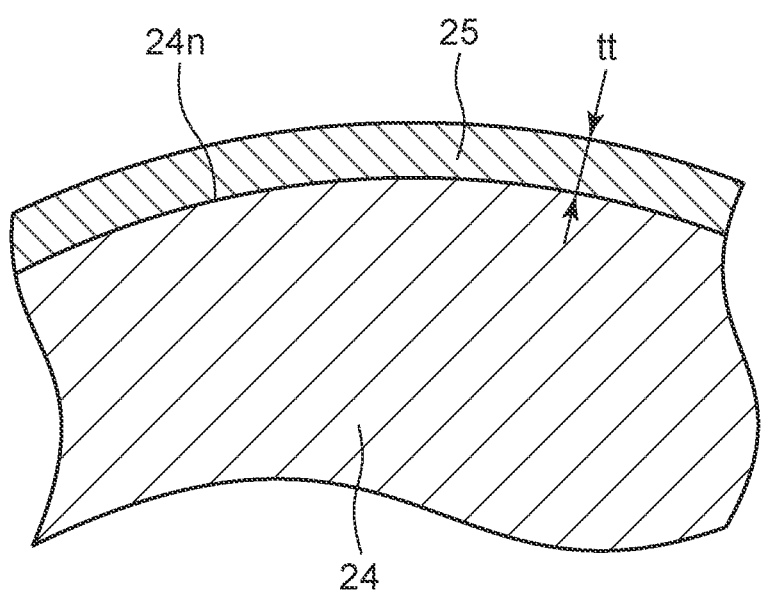
FIG. 4 is a diagram schematically showing the vicinity of a particle surface in a section of a positive electrode active material particle in the first embodiment, the second embodiment, and the modification embodiment.

In the embodiment, the positive electrode active material particles 24 are particles formed of a lithium transition metal composite oxide, specifically, $LiNi_{0.5}Mn_{1.5}O_4$ which is a lithium nickel manganese composite oxide having a spinel-type crystal structure. A film 25 containing fluorine and phosphorus is formed on a particle surface 24n of each of the positive electrode active material particles 24 (refer to FIG. 4). In addition to fluorine and phosphorus, the film 25 contains decomposition products of other components (an electrolyte and a nonaqueous solvent) of the nonaqueous electrolytic solution 40.

Next, the negative electrode sheet 31 will be described. In the negative electrode sheet 31, a negative electrode active material layer 33 having a belt shape is provided in a region in the width direction on both main surfaces of a negative electrode current collector foil 32 which is a belt-shaped copper foil, the region extending along the longitudinal direction. The negative electrode active material layer 33 contains negative electrode active material particles, a binder, and a thickener. In the embodiment, graphite particles are used as the negative electrode active material particles, styrene-butadiene rubber (SBR) is used as the binder, and carboxymethyl cellulose (CMC) is used as the thickener. In one end portion of the negative electrode current collector foil 32 in the width direction, the negative electrode current collector portion 31m is provided in which the negative electrode current collector foil 32 is exposed without the negative electrode active material layer 33 being present in the thickness direction. The negative electrode terminal 51 is welded to the negative electrode current collector portion 31m. The separator 39 is a porous film formed of a resin and has a belt shape.

Next, the nonaqueous electrolytic solution 40 will be described. The nonaqueous electrolytic solution 40 is accommodated in the battery case 10, a portion of the nonaqueous electrolytic solution 40 is impregnated into the electrode body 20, and the remaining nonaqueous electrolytic solution 40 remains in the bottom of the battery case 10 as an excess liquid. An electrolyte of the nonaqueous electrolytic solution 40 is lithium hexafluorophosphate ($LiPF_6$), and the concentration thereof is 1.0 M. A nonaqueous solvent of the nonaqueous electrolytic solution 40 is a mixed organic solvent containing fluoroethylene carbonate (FEC) and 2,2,2-trifluoroethyl methyl carbonate at a volume ratio of 1:1. As described above, the nonaqueous electrolytic solution 40 contains, as a compound 41 containing fluorine, not only $LiPF_6$ as a supporting electrolyte but also fluoroethylene carbonate (FEC) and 2,2,2-trifluoroethyl methyl carbonate as nonaqueous solvents.

Next, a method of manufacturing the battery 1 will be described. First, the positive electrode sheet 21 is formed. Specifically, the positive electrode active material particles 24 formed of $LiNi_{0.5}Mn_{1.5}O_4$, which is a lithium nickel manganese composite oxide having a spinel structure, is prepared. The positive electrode active material particles 24, the conductive material 26 (acetylene black), the binder 27 (polyvinylidene fluoride), and the metal phosphate particles 28 (lithium phosphate particles; average particle size D50=3.0 µm) are kneaded with a solvent (in the embodiment, NMP) to prepare a positive electrode paste. As described above, a mixing ratio of the positive electrode active material particles 24, the conductive material 26, and the binder 27 is 89:8:3 by weight. Further, a ratio of the metal phosphate particles 28 is 3 parts by weight with respect to 100 parts by weight of the positive electrode active material particles 24. In a case where the metal phosphate particles 28 have an average particle size D50 of 1.5µm or 0.8 µm as described below, the particle size is adjusted to a desired size using a wet bead mill.

Next, the positive electrode paste is applied to one main surface of the positive electrode current collector foil 22, which is a belt-shaped aluminum foil, and is dried to form the positive electrode active material layer 23. Further, the positive electrode paste is applied to the other main surface of the positive electrode current collector foil 22 and is dried to form the positive electrode active material layer 23. Next, the positive electrode active material layer 23 is pressed to obtain the positive electrode sheet 21. Separately, the negative electrode sheet 31 is formed using a well-known method.

Next, the positive electrode sheet 21 and the negative electrode sheet 31 are laminated with the pair of separators 39 interposed therebetween to obtain a laminate, and this laminate is wound using a winding core. Further, this wound body is pressed into a flat shape to form the electrode body 20. Separately, the case lid 13, the internal terminal member 53, the external terminal member 54, the bolt 55, the internal insulating member 57, and the external insulating member 58 are prepared. Each of the positive electrode terminal 50 and the negative electrode terminal 51 includes the internal terminal member 53, the external terminal member 54, and the bolt 55 and is fixed to the case lid 13 through the internal insulating member 57 and the external insulating member 58. Next, the positive electrode terminal 50 and the negative electrode terminal 51, which are integrated with the case lid 13, are welded to the positive electrode current collector portion 21m and the negative electrode current collector portion 31m of the electrode body 20, respectively. Next, the electrode body 20 is accommodated in the case body 11, and then the case lid 13 is welded to an opening of the case body 11 to form the battery case 10.

Separately, the nonaqueous electrolytic solution 40 is prepared. Specifically, fluoroethylene carbonate and 2,2,2-trifluoroethyl methyl carbonate are mixed with each other at a volume ratio of 1:1 to obtain a mixed organic solvent, and $LiPF_6$ is dissolved in the mixed organic solvent such that the concentration thereof is 1.0 M. Next, the nonaqueous electrolytic solution 40 is injected into the battery case 10 through the liquid injection hole 13h and is impregnated into the electrode body 20. Next, the liquid injection hole 13h is preliminarily sealed. As a result, the battery 1 is obtained.

Figure 5:
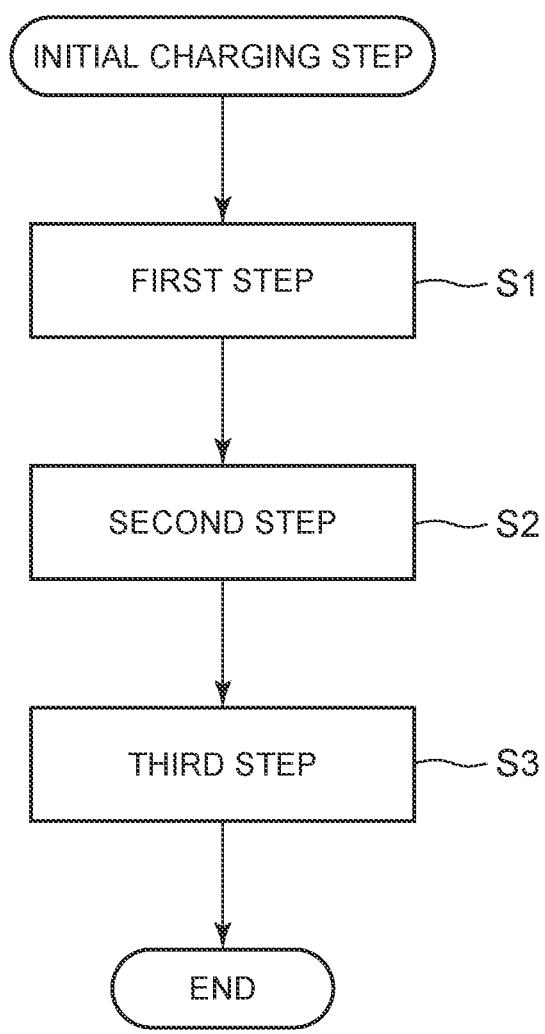
FIG. 5 is a flowchart showing the procedure of each step included in an initial charging step according to the first embodiment.

Next, the battery 1 is initially charged (initial charging step). In the initial charging step, when the battery 1 is initially charged, the film 25 containing fluorine and phosphorus is formed on the particle surface 24n of each of the positive electrode active material particles 24. Specifically, in the initial charging step, first, the battery 1 is connected to a CC-CV charging-discharging device (not shown). As shown in FIG. 5, the battery 1 is charged by CC charging at a current of 3.0 C such that the inter-terminal voltage Vt is increased to 4.1 V (first voltage Vh) (first step S1). Next, CC charging is changed to CV charging in which the inter-terminal voltage Vt is 4.1 V. That is, the inter-terminal voltage Vt is held at the first voltage Vh of 4.1 V for the holding period Tk of 60 minutes (second step S2). Further, next, constant-current charging (CC charging) is performed at a constant current of 3.0 C until the inter-terminal voltage Vt reaches a second voltage Ve, specifically, 4.9 V (third step S3).

During the above-described initial charging, specifically, mainly in the second step, the film 25 containing fluorine and phosphorus is formed on the particle surface 24n of each of the positive electrode active material particles 24 while holding the inter-terminal voltage Vt at the first voltage Vh (Vh=4.1 V; positive electrode potential Ep of positive electrode sheet 21=4.3 V (vs. Li/Li+); negative electrode potential En of negative electrode sheet 31=0.2 V (vs. Li/Li+)). At this time, as described below, the positive electrode potential Ep of 4.3 V (vs. Li/Li+) is a value which is higher than a decomposition lower limit potential EPd of 4.2 V (vs. Li/Li+) by 0.1 V. The first voltage Vh of 4.1 V at which the inter-terminal voltage Vt is held is a value which is higher than a decomposition lower limit voltage Vtd of 4.0 V by 0.1 V.

The mechanism for the formation of the film 25 is not clear but is presumed to be as follows. That is, in a case where the positive electrode potential (redox potential) Ep of the positive electrode sheet 21 (positive electrode active material particles 24) is equal to or higher than the decomposition lower limit potential Epd described below, on the particle surfaces 24n of the positive electrode active material particles 24, the nonaqueous solvent (in the embodiment, fluoroethylene carbonate (FEC) and 2,2,2-trifluoroethyl methyl carbonate) of the nonaqueous electrolytic solution 40 contacting the surfaces 24n is oxidized and decomposed to produce hydrogen ions. In the nonaqueous electrolytic solution 40, the hydrogen ions react with fluorine of the compound 41 containing fluorine (in the embodiment, $LiPF_6$ as a supporting electrolyte, and fluoroethylene carbonate (FEC) and 2,2,2-trifluoroethyl methyl carbonate as solvents) to produce hydrofluoric acid (HF). It is presumed that this hydrofluoric acid reacts with the metal phosphate (lithium phosphate) particles 28 contained in the positive electrode active material layer 23 so as to form the film 25 containing fluorine and phosphorus on the particle surfaces 24n of the positive electrode active material particles 24. Next, the preliminary sealing of the battery is released, and then the battery is mainly sealed under reduced pressure. Further, various tests are performed. Thus, the battery 1 is completed.

(Measurement of Decomposition Lower Limit Voltage and Decomposition Lower Limit Potential)

Next, in the battery 1 having the above-described configuration, the decomposition lower limit potential Epd, which is the lowest positive electrode potential Ep of the positive electrode sheet 21 (positive electrode active material particles 24) at which the nonaqueous electrolytic solution (nonaqueous solvent) 40 is oxidized and decomposed, is detected as follows. First, a measurement cell, which includes a working electrode formed of a Pt plate, a counter electrode formed of lithium metal, a reference electrode, and the nonaqueous electrolytic solution 40 used in the battery 1, is prepared. Using an electrochemical measurement system manufactured by AMTEK, Inc., CV measurement of increasing and decreasing the potential of the working electrode of the measurement cell in a range of 3.0 V to 5.4 V (vs. Li/Li+) at a rate of 1 mV/sec is performed in two cycles. Further, when the potential of the working electrode is increased in a third cycle, a relationship between the positive electrode potential Ep (V (vs. Li/Li+)) and a current I ($\mu A/cm^2$) flowing at this time is acquired (refer to FIG. 6). The current on the charging side is represented by a positive value. Based on the relationship, a relationship between the positive electrode potential Ep (V (vs. Li/Li+)) and a differential value dI/dEp is acquired (FIG. 7). In a portion where the differential value dI/dEp linearly increases along with an increase in the positive electrode potential Ep, an approximation straight line L is drawn to overlap the change of the differential value dI/dEp. On the approximation straight line L, a value of the positive electrode potential Ep at which the differential value dI/dEp is 0 is set as "decomposition lower limit potential (vs. Li/Li+)" Epd of the nonaqueous electrolytic solution 40.

Figure 6:
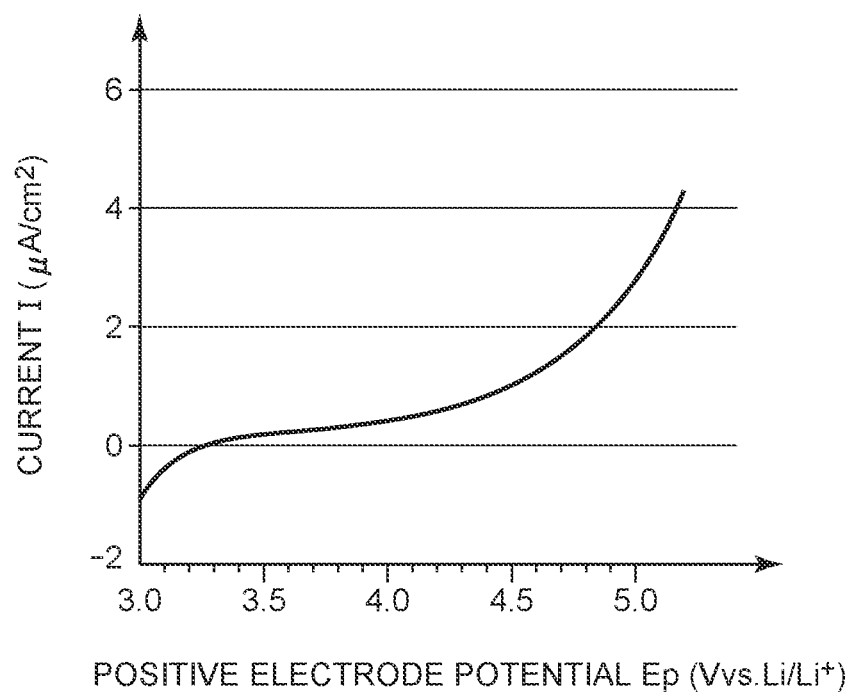
FIG. 6 is a graph showing a relationship between a positive electrode potential Ep, which is measured using a measurement cell, and a current I flowing at this time regarding a nonaqueous electrolytic solution used in the battery according to the first embodiment, the second embodiment, and the modification embodiment.
Figure 7:
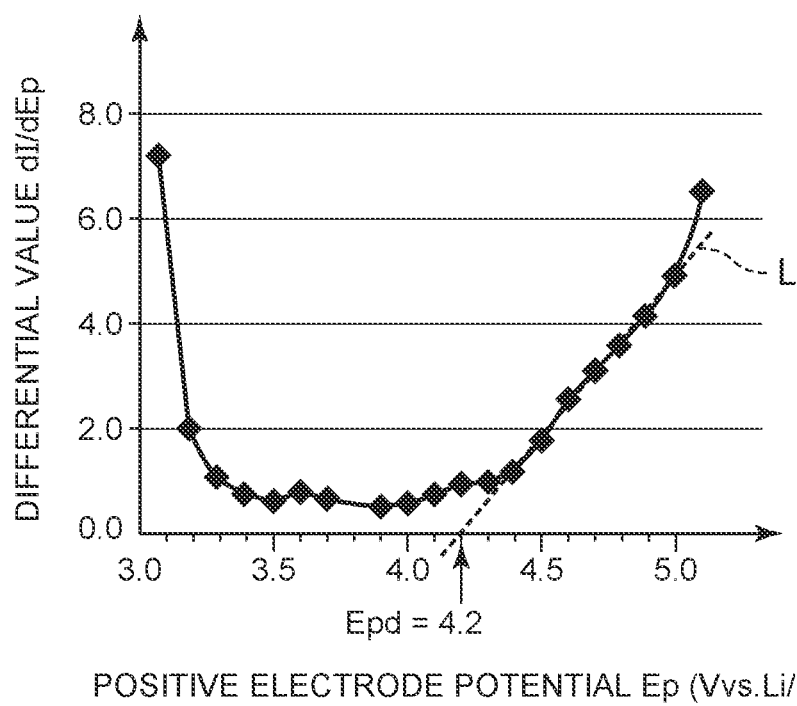
FIG. 7 is a graph showing a relationship between the positive electrode potential Ep and a differential value dI/dEp obtained from the graph shown in FIG. 6.

FIG. 6 shows a relationship between the positive electrode potential Ep (V (vs. Li/Li+)) which is measured as described above and the current I ($\mu A/cm^2$) flowing at this time regarding the nonaqueous electrolytic solution 40 (fluoroethylene carbonate (FEC)+2,2,2-trifluoroethyl methyl carbonate (1:1) and $LiPF_6$: 1.0 M) used in the battery 1. FIG. 7 shows a relationship between the positive electrode potential Ep (V (vs. Li/Li+)) and the differential value dI/dEp.

According to the graph of the positive electrode potential Ep vs. the current I shown in FIG. 6, it seems that, in a positive electrode potential Ep range of 3.3 V to 4.1 V (vs. Li/Li+), the current I linearly increases along with an increase in the positive electrode potential Ep. However, it seems that, in a positive electrode potential Ep range of 4.2 V (vs. Li/Li+) or higher, the current I increases at an accelerated pace along with an increase in the positive electrode potential Ep.

Therefore, the differential value dI/dEp is calculated to obtain a graph of the positive electrode potential Ep vs. the differential value dI/dEp (refer to FIG. 7). As a result, it can be seen that, in a positive electrode potential Ep range of 4.4 V to 5.0 V (vs. Li/LI+), the differential value dI/dEp linearly increases along with an increase in the positive electrode potential Ep (that is, the current I increases at an accelerated pace (quadratically in proportion to the square of the potential)). Therefore, the approximation straight line L is drawn so as to be fitted to a range where the differential value dI/dEp linearly increases. On the approximation straight line L, a value of the positive electrode potential Ep at which the differential value dI/dEp is 0 (X-intercept in the graph of FIG. 7) is 4.2 V (vs. Li/Li+). Therefore, this value of the positive electrode potential Ep (=4.2 V (vs. Li/Li+)) is set as the decomposition lower limit potential Epd of the nonaqueous electrolytic solution 40 according to the embodiment. The reason for this is presumed to be as follows. When the positive electrode potential Ep exceeds the decomposition lower limit potential Epd, the oxidative decomposition of the nonaqueous solvent increases at an accelerated pace (quadratically) along with an increase in the positive electrode potential Ep.

In the battery 1, as described above, graphite is used as a negative electrode active material, the negative electrode potential En is constant at 0.2 V (vs. Li/Li+). Accordingly, in a state where the potential of the positive electrode sheet 21 reaches the decomposition lower limit potential Epd (=4.2 V (vs. Li/Li+)), the inter-terminal voltage Vt of the battery 1 is 4.0 V (Vt=Ep−En=4.2−0.2=4.0 V). Therefore, this value is "decomposition lower limit voltage" Vtd (=4.0 V) of the battery 1.

Further, in the battery 1, using the decomposition lower limit voltage Vtd, "lower decomposition range" Ad of the nonaqueous electrolytic solution is defined as a range of Vtd to Vtd+0.4. Specifically, the lower decomposition range Ad is a value in a range of 4.0 V to 4.4 V (refer to FIG. 8).

Examples 1 and 2 and Comparative Examples 1 to 3

Next, an experiment, which was performed to verify the effects of the invention, and the results thereof will be described. As shown in Table 1 below, the same battery as that of the battery 1 including the positive electrode sheet 21, the negative electrode sheet 31, the separator 39, and the nonaqueous electrolytic solution 40 was prepared. A test was performed using five test conditions of Examples 1 and 2 and Comparative Examples 1 to 3. Accordingly, the positive electrode active material layer 23 of the battery of each of the examples contained 3 parts by weight of lithium phosphate particles (LPO) having an average particle size D50 of 3.0 μm when the positive electrode active material particles 24 contained in the positive electrode active material layer 23 is represented by 100 parts by weight (refer to Table 1).

In the battery according to Comparative Example 1, during initial charging, the inter-terminal voltage Vt was increased to 3.8 V which was lower than the lower limit value of the lower decomposition range Ad of 4.0 V to 4.4 V (first step), and this value of the inter-terminal voltage Vt (first voltage Vh=3.8 V) was held for the holding period Tk of 60 minutes (second step). Next, constant-current charging was performed at a CC charging rate of 3.0 C until the inter-terminal voltage Vt reached the second voltage Ve of 4.9 V (third step). Then, initial charging was finished. The total charging time required for the initial charging of the battery according to Comparative Example 1 was 80 minutes.

In the battery according to Example 1, during initial charging, the inter-terminal voltage Vt was increased to 4.1 V which was in the lower decomposition range Ad (first step), and the inter-terminal voltage Vt (first voltage Vh=4.1 V) was held for the holding period Tk of 60 minutes (second step). Next, constant-current charging was performed at a CC charging rate of 3.0 C until the inter-terminal voltage Vt reached the second voltage Ve of 4.9 V (third step). Then, initial charging was finished. The total charging time required for the initial charging was 80 minutes.

Example 2 was different from Example 1 only in the period for which the inter-terminal voltage Vt was held. That is, the inter-terminal voltage Vt was increased to 4.4 V which was in the lower decomposition range Ad, and this value of the inter-terminal voltage Vt (first voltage Vh=4.4 V) was held for the holding period Tk of 60 minutes. Next, CC charging was performed at a CC charging rate of 3.0 C. The total charging time required for the initial charging was 80 minutes.

Comparative Example 2 was also different from Example 1 only in the period for which the inter-terminal voltage Vt was held. That is, the inter-terminal voltage Vt was increased to 4.7 V which was higher than the lower decomposition range Ad, and this value of the inter-terminal voltage Vt (first voltage Vh=4.7 V) was held for the holding period Tk of 60 minutes. Next, CC charging was performed at a CC charging rate of 3.0 C. The total charging time required for the initial charging was 80 minutes.

Comparative Example 3 is different from Comparative Examples 1 and 2 and Examples 1 and 2, in that the second step of holding the voltage is not provided. That is, at the beginning of the initial charging, constant-current charging was performed at a CC charging rate of 3.0 C until the inter-terminal voltage Vt reached the second voltage Ve of 4.9 V. Then, initial charging was finished. The total charging time required for the initial charging was 20 minutes which was shorter than in other examples.

Figure 8:
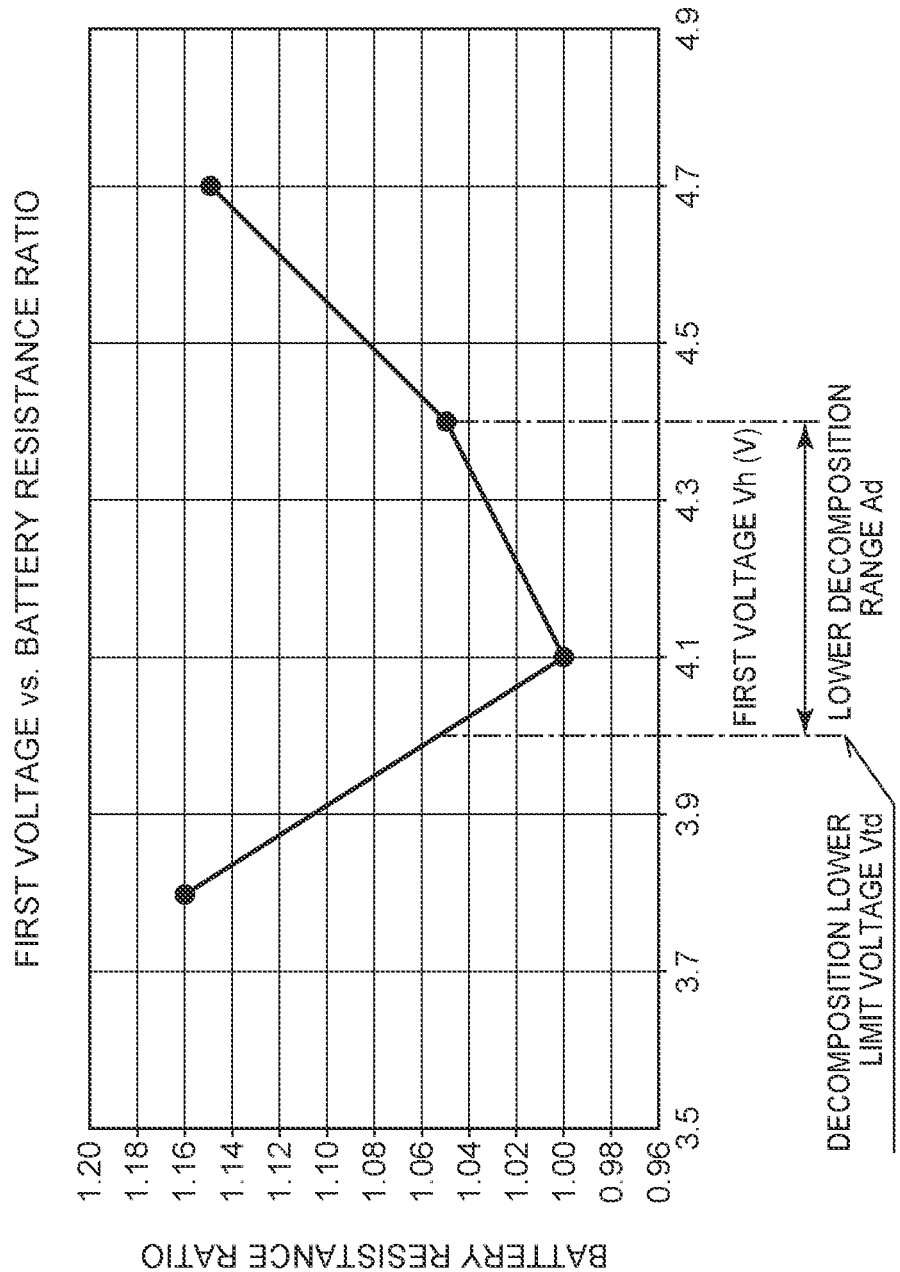
FIG. 8 is a graph showing a relationship between a first voltage and a battery resistance ratio in each of batteries according to Examples 1 and 2 and Comparative Examples 1 and 2.

Regarding each of the batteries according to Comparative Examples 1 to 3 and Examples 1 and 2, the battery resistance (IV resistance) was measured after the completion of initial charging. Specifically, in a temperature environment of 25° C., the SOC of each of the batteries was adjusted to 60%, and then the battery was discharged at a constant current of 0.3 C for 10 seconds. A change in the voltages before and after discharging was measured. Further, the battery was discharged under the same conditions as described above, except that only the discharge current value was sequentially increased to 1 C, 3 C, and 5 C. A change in the voltages before and after the discharging for 10 seconds was measured. Next, this data was plotted on a coordinate plane in which the horizontal axis represents the discharge current value and the vertical axis represents the change in the voltages before and after the discharging. Then, an approximation straight line (linear) was calculated using a least-square method, and the slope thereof was obtained as an IV resistance value. "Battery resistance ratio" of each of the other batteries was calculated with respect to the battery resistance (IV resistance) of the battery of Example 2 set as a reference (=1.00). The results are shown in Table 1 and FIG. 8. FIG. 8 is a graph showing a relationship between the first voltage Vh and the battery resistance ratio in each of the batteries. However, FIG. 8 does not show the result of Comparative Example 3.

Figure 9:
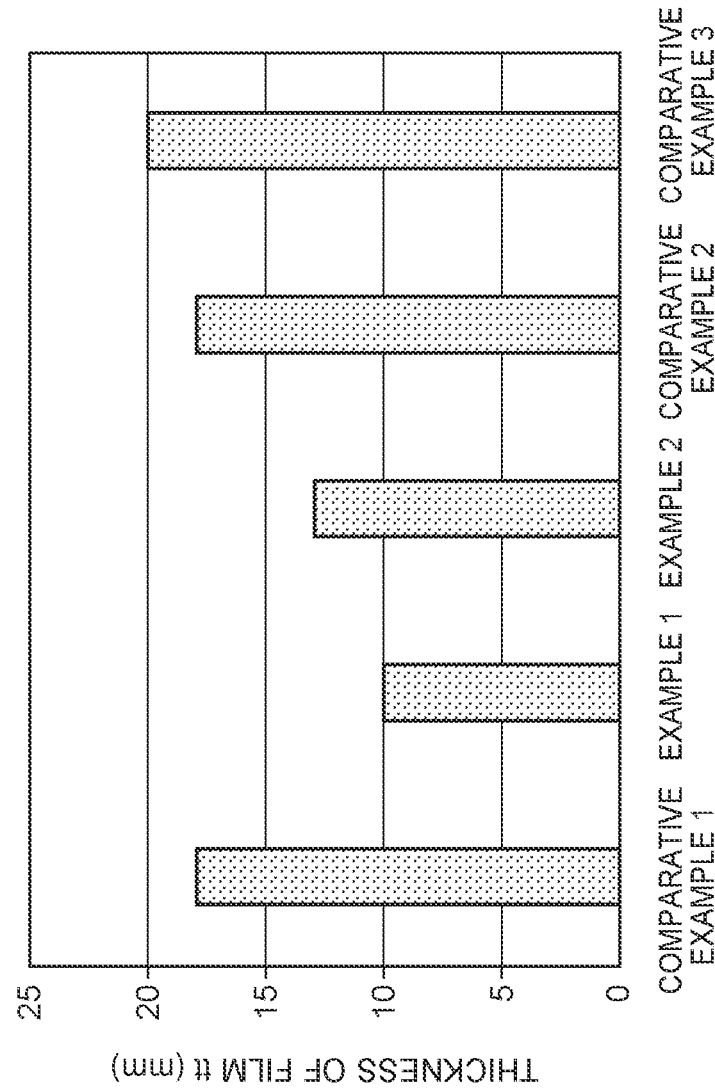
FIG. 9 is a graph showing the thickness of a film formed on positive electrode active material particles of each of the batteries according to Examples 1 and 2 and Comparative Examples 1 to 3.

Further, each of the batteries according to Comparative Examples 1 to 3 and Examples 1 and 2 was disassembled to extract the positive electrode active material particles 24. Using a transmission electron microscope (TEM), the thickness of the film 25 containing fluorine and phosphorus formed on the particle surfaces 24n of the positive electrode active material particles 24 was measured (n=3). The results are shown in Table 1 and FIG. 9. FIG. 9 is a graph showing the thickness of the film formed on positive electrode active material particles of each of the batteries.

TABLE 1

|  | Average Particle Size D50 of LPO μm | First Voltage Vh V | Holding Period Th min | CC Charging Rate C | Total Charging Time min | Battery Resistance Ratio | Thickness tt of Film mm |
|---|---|---|---|---|---|---|---|
| Comparative Example 1 | 3.0 | 3.8 | 60 | 3.0 | 80 | 1.16 | 18 |
| Example 1 | 3.0 | 4.1 | 60 | 3.0 | 80 | 1.00 | 10 |
| Example 2 | 3.0 | 4.4 | 60 | 3.0 | 80 | 1.05 | 13 |
| Comparative Example 2 | 3.0 | 4.7 | 60 | 3.0 | 80 | 1.15 | 18 |
| Comparative Example 3 | 3.0 | — | 0 | 3.0 | 80 | 1.18 | 20 |

It can be seen from Table 1 and FIG. 8 that, in a case where the holding period Tk was 60 minutes, the battery resistance ratio was the lowest at a first voltage Vh of 4.1 V (Example 1). It can also seen that, in a case where the first voltage Vh was 4.4 V (Example 2), the battery resistance ratio was 1.05, and the resistance was increased by only about 5%. In Examples 1 and 2, the first voltage Vh in the second step was 4.1 V or 4.4 V which was slightly higher than the decomposition lower limit voltage Vtd of 4.0 V. Therefore, during the second step, the nonaqueous electrolytic solution 40 was oxidized and decomposed. However, the first voltage Vh was in a low voltage range of the lower decomposition range Ad (=4.0 V to 4.4 V) although it was in a range where the nonaqueous electrolytic solution is oxidized and decomposed. Therefore, it is presumed that the nonaqueous electrolytic solution 40 was slowly oxidized and decomposed, an excessive increase in the thickness of the film 25 containing fluorine and phosphorus formed on the particle surfaces 24*n* of the positive electrode active material particles 24 was able to be prevented, and the battery resistance was able to be reduced to be low. The thickness tt of the film 25 containing fluorine and phosphorus shown in Table 1 and FIG. 9 was 10 nm in Example 1 and was 13 nm Example 2, which were less than those in Comparative Examples 1 to 3. The above results also show that an excessive increase in the thickness of the film 25 containing fluorine and phosphorus was able to be prevented.

On the other hand, in Comparative Example 2, the first voltage Vh in the second step was 4.7 V which was much higher than the decomposition lower limit voltage Vtd of 4.0 V (which was higher than the lower decomposition range Ad). Therefore, during the second step, a high current flowed, and the oxidative decomposition of the nonaqueous electrolytic solution 40 became severe at one time, and the thickness of the film 25 containing fluorine and phosphorus formed on the particle surface 24*n* of the positive electrode active material particles 24 was excessively large. As a result, it is presumed that the battery resistance was higher than those of Examples 1 and 2. The thickness tt of the film 25 containing fluorine and phosphorus shown in Table 1 and FIG. 9 was 18 nm in Comparative Example 2, which were more than those in Examples 1 and 2. The above result also shows that the thickness of the film 25 containing fluorine and phosphorus was excessively large.

In Comparative Example 3, the second step was not provided and high-current CC charging was performed at a charging rate of 3.0 C from the beginning. Therefore, it is presumed that, the oxidative decomposition of the nonaqueous electrolytic solution 40 became severe at one time, and thus the thickness of the formed film 25 was large. The thickness tt of the film 25 shown in Table 1 and FIG. 9 was 20 nm in Comparative Example 3, which was the largest. The above result also shows that the thickness of the film 25 was large.

In Comparative Example 1, the first voltage Vh in the second step was 3.8 V which was lower than the decomposition lower limit voltage Vtd of 4.0 V (which was lower than the lower decomposition range Ad). Therefore, it is presumed that the nonaqueous electrolytic solution 40 was not substantially oxidized and decomposed during the second step, and the film was substantially not formed in the second step. However, it is presumed that, in the following third step, the thickness of the formed film 25 was large due to the high-current CC charging at a charging rate of 3.0 C. Accordingly, in Comparative Example 1, the formation of the film was observed, but a formation pattern thereof was similar to that of Comparative Example 3. The above result also shows that the thickness tt of the film 25 shown in Table 1 and FIG. 9 was 18 nm in Comparative Example 1, which were more than those in Examples 1 and 2. Further, the above result also shows that the battery resistance was higher than those of Examples 1 and 2.

It can be understood from the above results that, by adjusting the first voltage Vh in the second step to be in a range of the decomposition lower limit voltage Vtd (=4.0 V; lower limit) to "the decomposition lower limit voltage Vtd+0.4 V" (=4.4 V; upper limit), that is, in the above-described lower decomposition range Ad (Vt=4.0 V to 4.4 V), the thickness of the film 25 can be made thin, and the battery resistance can also be reduced.

Comparative Examples 3 to 6 and Examples 1 and 3 to 13

Next, regarding each of batteries according to Comparative Examples 3 to 6 and Examples 1 and 3 to 13 which were different in the average particle size of the metal phosphate (LPO) added to the positive electrode active material layer, a test was performed while changing the holding period Tk, and a battery resistance ratio was obtained (refer to Table 2). Specifically, a battery was prepared in which 3.00 mass % of lithium phosphate particles (LPO) having an average particle size D50 of 3.0 μm as in Example 1 was added to the positive electrode active material layer 23. The battery was initially charged until the inter-terminal voltage Vt of the battery reached 4.1 V (first step). Next, after the first voltage Vh of 4.1 V was held for the holding period Tk of 0 minutes, 20 minutes, 40 minutes, 60 minutes, or 90 minutes (second step), constant-current charging was performed at a CC charging rate of 3.0 C until the inter-terminal voltage Vt reached the second voltage Ve of 4.9 V (third step). In this way, batteries according to Comparative Example 3 and Examples 1, 3 to 5 were obtained. The example in which the holding period Tk was 0 minutes corresponds to Comparative Example 3 described above, and the example in which the holding period Tk was 60 minutes corresponds to Example 1 described above.

A battery was prepared in which 3 parts by weight (with respect to the positive electrode active material particles 24 (100 parts by weight)) of lithium phosphate particles (LPO) having an average particle size D50 of 1.5 μm unlike in Example 1 and the like was added to the positive electrode active material layer 23. The battery was initially charged until the inter-terminal voltage Vt of the battery reached 4.1 V (first step). Next, after the inter-terminal voltage Vt was held at the first voltage Vh of 4.1 V for the holding period Tk of 0 minutes, 10 minutes, 20 minutes, 30 minutes, or 60 minutes (second step), constant-current charging was performed at a CC charging rate of 3.0 C until the inter-terminal voltage Vt reached the second voltage Ve of 4.9 V (third step). In this way, batteries according to Comparative Example 4 and Examples 6 to 9 were obtained.

Further, a battery was prepared in which 3 parts by weight (with respect to the positive electrode active material particles 24 (100 parts by weight)) of lithium phosphate particles (LPO) having an average particle size D50 of 0.8 μm unlike in Example 1 and the like was added to the positive electrode active material layer 23. The battery was initially charged until the inter-terminal voltage Vt of the battery reached 4.1 V (first step). Next, after the inter-terminal voltage Vt was held at the first voltage Vh of 4.1 V for the holding period Tk of 0 minutes, 10 minutes, 20 minutes, 30 minutes, or 60 minutes (second step), constant-current charging was performed at a CC charging rate of 3.0 C until the inter-terminal voltage Vt reached the second voltage Ve of 4.9 V (third step). In this way, batteries according to Comparative Example 5 and Examples 10 to 13 were obtained.

In Comparative Example 6, the same battery as that of Example 1 was initially charged by constant-current charging at a CC charging rate of 0.33 C for 180 minutes from the beginning until the inter-terminal voltage Vt reached the second voltage Ve of 4.9 V. The battery according to Comparative Example 6 was charged at a low charging rate (charge current) of 0.33 C. Therefore, even when the nonaqueous electrolytic solution 40 (nonaqueous solvent) is oxidized and decomposed during the initial charging, the oxidative decomposition does not became severe at one time. Accordingly, it is presumed that the film 25 containing fluorine and phosphorus was slowly formed on the particle surfaces 24n of the positive electrode active material particles 24, and the thickness of the formed film 25 was small. As a result, the battery resistance (IV resistance) was also low.

Figure 10:
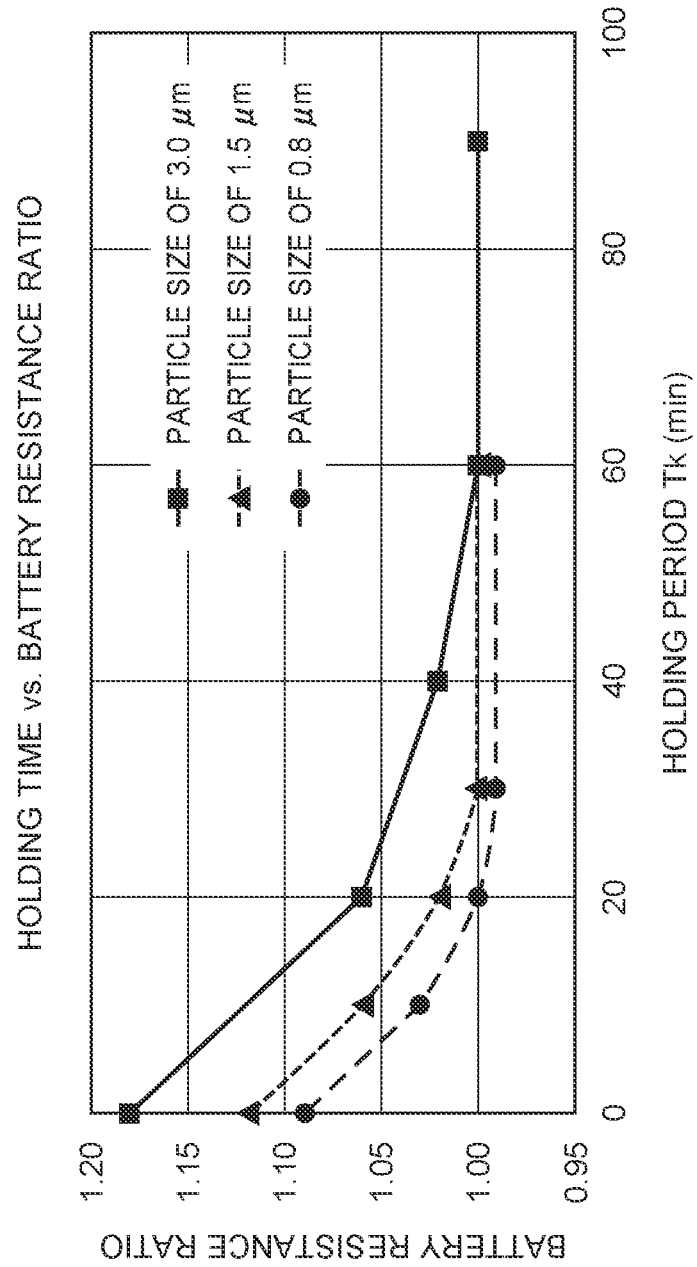
FIG. 10 is a graph showing a relationship between a holding period and a battery resistance ratio in each of batteries according to Examples 4 to 13 and Comparative Examples 4 to 7.

Regarding each of the batteries according to Comparative Examples 3 to 6 and Examples 1 and 3 to 13, the battery resistance (IV resistance) was measured using the same method as in Example 1 and the like described above after the completion of initial charging. "Battery resistance ratio" of each of the other batteries was calculated with respect to the battery resistance (IV resistance) of the battery of Comparative Example 6 set as a reference (=1.00). The results are shown in Table 2 and FIG. 10. FIG. 10 is a graph showing a relationship between the holding period Tk and the battery resistance ratio in each of the batteries. However, FIG. 10 does not show the result of Comparative Example 6.

TABLE 2

| | Average Particle Size D50 of LPO μm | First Voltage Vh V | Holding Period Th min | CC Charging Rate C | Total Charging Time min | Battery Resistance Ratio |
|---|---|---|---|---|---|---|
| Comparative Example 3 | 3.0 | — | 0 | 3.0 | 20 | 1.18 |
| Example 3 | 3.0 | 4.1 | 20 | 3.0 | 40 | 1.06 |
| Example 4 | 3.0 | 4.1 | 40 | 3.0 | 60 | 1.02 |
| Example 1 | 3.0 | 4.1 | 60 | 3.0 | 80 | 1.00 |
| Example 5 | 3.0 | 4.1 | 90 | 3.0 | 110 | 1.00 |
| Comparative Example 4 | 1.5 | — | 0 | 3.0 | 20 | 1.12 |
| Example 6 | 1.5 | 4.1 | 10 | 3.0 | 30 | 1.06 |
| Example 7 | 1.5 | 4.1 | 20 | 3.0 | 40 | 1.02 |
| Example 8 | 1.5 | 4.1 | 30 | 3.0 | 50 | 1.00 |
| Example 9 | 1.5 | 4.1 | 60 | 3.0 | 80 | 1.00 |
| Comparative Example 5 | 0.8 | — | 0 | 3.0 | 20 | 1.09 |
| Example 10 | 0.8 | 4.1 | 10 | 3.0 | 30 | 1.03 |
| Example 11 | 0.8 | 4.1 | 20 | 3.0 | 40 | 1.00 |
| Example 12 | 0.8 | 4.1 | 30 | 3.0 | 50 | 0.99 |
| Example 13 | 0.8 | 4.1 | 60 | 3.0 | 80 | 0.99 |
| Comparative Example 6 | 3.0 | — | 0 | 0.33 | 180 | 1.00 |

In Table 2 and FIG. 10, first, the batteries according to Comparative Example 3 and Examples 1 and 3 to 5 in which the lithium phosphate particles (LPO) having an average particle size D50 of 3.0 μm were used will be discussed. As can be seen from Table 2 and FIG. 10, in the Comparative Example 3 corresponding to the example in which the holding period Tk was 0 minutes, the battery resistance ratio was 1.18, and the battery resistance was high. However, in all of the batteries according to Examples 3, 4, and 1 (the holding periods Tk were 20 minutes, 40 minutes, and 60 minutes, respectively), the battery resistance ratios (battery resistances) were lower than that of Comparative Example 3. However, when the batteries according to Examples 3, 4, and 1 (the holding periods Tk were 20 minutes, 40 minutes, and 60 minutes, respectively) were compared to each other, it was found that, as the holding period Tk of the battery increased, the battery resistance ratio (battery resistance) decreased. The reason for this is presumed to be as follows. When the holding period Tk is short, the film 25 is formed, but the thickness thereof insufficient. In addition, the formation of the film is stopped in a state where the nonaqueous electrolytic solution 40 (nonaqueous solvent) is likely to be oxidized and decomposed. Therefore, when CC charging is performed at a charging rate of 3.0 C in the third step after the second step, the oxidative decomposition of the nonaqueous solvent becomes severe at one time due to the high current. Therefore, in addition to the film formed for the holding period, a thick film is formed. Therefore, in the batteries (Examples 3 and 4) in which the holding period Tk was shorter than that of Example 1, the resistance was higher than that of the battery (Example 1) in which the holding period Tk was sufficiently secured. However, in Examples 3 and 4, the film 25 was formed in the second step in advance, and thus the oxidative decomposition of the nonaqueous solvent during CC charging was prevented as compared to the battery according to Comparative Example 3 in which the second step was not provided. Therefore, it is presumed that, in Examples 3 and 4, the battery resistance was reduced to be lower than that of the battery (Comparative Example 3) in which the holding period Tk was not present. In addition, it is presumed that, in Example 4, the battery resistance was reduced to be lower than that of Example 3. In the battery according to Example 1 (holding period Tk: 60 minutes) in which the holding period Tk was able to be appropriately secured, the battery resistance ratio (battery resistance) was able to be reduced to be at the same level as in Comparative Example 6.

On the other hand, in a case where the battery according to Example 5 (holding period Tk: 90 minutes) was compared to the battery according to Example 1 (holding period Tk: 60 minutes), even when the holding period Tk was increased, the battery resistance ratio did not change (did not decrease). Once the film 25 was formed, the oxidative decomposition of the nonaqueous solvent was not likely to be occur and then was prevented. As a result, the formation of the film 25 was stopped, and thus it is presumed that an increase in the thickness of the film 25 was stopped, and an increase in battery resistance was also stopped. Accordingly, even when the holding period Tk is unnecessarily increased, an effect of reducing the battery resistance is not obtained, and the following can be seen: it is preferable that the third step is performed after performing the second step for an appropriate holding period Tk.

Next, the batteries according to Comparative Example 4 and Examples 6 to 9 in which the lithium phosphate particles (LPO) having an average particle size D50 of 1.5 μm were used will be discussed. The results of these batteries can be considered to be the same as those of the batteries according to Comparative Example 3 and Examples 1 and 3 to 5. That is, in the Comparative Example 4 corresponding to the example in which the holding period Tk was 0 minutes, the battery resistance ratio was 1.12, and the battery resistance was high. However, in all of the batteries according to Examples 6 to 8 (the holding periods Tk were 10 minutes, 20 minutes, and 30 minutes, respectively), the battery resistance ratios (battery resistances) were lower than that of Comparative Example 4. However, when the batteries according to Examples 6 to 8 (the holding periods Tk were 10 minutes, 20 minutes, and 30 minutes, respectively) were compared to each other, it was found that, as the holding period Tk of the battery increased, the battery resistance ratio (battery resistance) decreased. In the battery according to Example 8 (holding period Tk: 30 minutes), the battery resistance ratio (battery resistance) was able to be reduced to be at the same level as in Comparative Example 6. On the other hand, in a case where the battery according to Example 9 (holding period Tk: 60 minutes) was compared to the battery according to Example 8 (holding period Tk: 30 minutes), even when the holding period Tk was increased, the battery resistance ratio did not change (did not decrease).

Further, the batteries according to Comparative Example 5 and Examples 10 to 13 in which the lithium phosphate particles (LPO) having an average particle size D50 of 0.8 µm were used were discussed. The results of these batteries can be considered to be the same as those of the batteries according to Comparative Example 3 and Examples 1, 3 to 5 and those according to Comparative Example 4 and Examples 6 to 9. That is, in the Comparative Example 5 corresponding to the example in which the holding period Tk was 0 minutes, the battery resistance ratio was 1.09, and the battery resistance was high. However, in all of the batteries according to Examples 10 to 12 (the holding periods Tk were 10 minutes, 20 minutes, and 30 minutes, respectively), the battery resistance ratios (battery resistances) were lower than that of Comparative Example 5. However, when the batteries according to Examples 10 to 12 (the holding periods Tk were 10 minutes, 20 minutes, and 30 minutes, respectively) were compared to each other, it was found that, as the holding period Tk of the battery increased, the battery resistance ratio (battery resistance) decreased. In the battery according to Example 11 (holding period Tk: 20 minutes), the battery resistance ratio (battery resistance) was able to be reduced to be at the same level as in Comparative Example 6. In the battery according to Example 12 (holding period Tk: 30 minutes), the battery resistance ratio (battery resistance) was able to be reduced to be lower than that in Comparative Example 6 (battery resistance ratio: 0.99). However, in a case where the battery according to Example 13 (holding period Tk: 60 minutes) was compared to the battery according to Example 12 (holding period Tk: 30 minutes), even when the holding period Tk was increased, the battery resistance ratio did not change (did not decrease).

It can be understood from the above results that, by providing the second step of holding the first voltage Vh for the holding period Tk, the battery resistance can be reduced as compared to a case where the second step is not provided. Further, when the holding period Tk is increased, the battery resistance can be reduced. However, there is an appropriate length as the holding period Tk, and even when the holding period Tk is unnecessarily increased, the battery resistance does not decrease. Therefore, the following can be seen: it is preferable that the third step is performed after performing the second step for an appropriate holding period Tk.

Based on the above results, the following can be seen: it is preferable that the holding period Tk satisfies Rn=0.98Re to 1.02Re, in which Rn represents a battery resistance of a battery manufactured by performing the second step without extending the holding period Tk and then performing the third step, and Re represents a battery resistance of a holding period extended battery manufactured by holding the first voltage Vh not for the holding period Tk but for an extended holding period, which is 1.5 times the holding period, and performing the third step. When the first voltage Vh is held for the holding period Tk which is selected as described above, the film 25 can be formed such that a difference between the battery resistance Rn and the battery resistance Re of the holding period extended battery, in which the holding period extends to 1.5 times, is within 2% at most. Accordingly, when the first voltage Vh is held for the holding period Tk, the process can rapidly proceed to the following third step in a state where the formation of the film 25 is substantially completed. That is, a battery having a low battery resistance can be manufactured within a short period of time, in which the thin film 25, which can prevent the oxidative decomposition of the nonaqueous solvent, is appropriately formed on the particle surfaces 24n of the positive electrode active material particles 24.

Specifically, regarding a battery having a specific configuration which is manufactured as shown in Table 2 and FIG. 10, a relationship between the holding period and the battery resistance may be acquired in advance, and the holding period Tk may be selected to satisfy Rn=0.98Re to 1.02Re, in which Rn represents the battery resistance of a case where the holding period Tk is a specific value, and Re represents the battery resistance of a case where the holding period is 1.5 times the specific value. For example, the batteries (represented by "■" in FIG. 10) according to Comparative Example 3 and Examples 1 and 3 to 5 in which the lithium phosphate particles (LPO) having an average particle size D50 of 3.0 µm was used will be described as an example. In the battery (Example 4) in which the holding period Tk was 40 minutes, the battery resistance Rn was 1.02 by battery resistance ratio. On the other hand, in the battery (Example 1) in which the holding period Tk was 60 minutes which was 1.5 times 40 minutes, the battery resistance Re was 1.00 by battery resistance ratio. Accordingly, in the battery according to Example 4, the battery resistance Rn is in a range of 0.98Re to 1.02Re. It can be seen from the above results that, in the batteries (Comparative Example 3 and Examples 1 and 3 to 5) in which the lithium phosphate particles (LPO) having an average particle size D50 of 3.0 µm were used, the holding period Tk is preferably 40 minutes or longer.

Further, the following can be seen: it is more preferable that the holding period Tk satisfies Rn=0.99Re to 1.01Re, in which Rn represents a battery resistance of a battery manufactured by performing the second step without extending the holding period Tk and then performing the third step, and Re represents a battery resistance of a holding period extended battery manufactured by holding the first voltage Vh not for the holding period Tk but for an extended holding period, which is 1.5 times the holding period, and performing the third step. When the first voltage Vh is held for the holding period Tk which is selected as described above, the film 25 can be formed such that a difference between the battery resistance Rn and the battery resistance Re of the holding period extended battery, in which the holding period extends to 1.5 times, is within 1% at most. Accordingly, when the first voltage Vh is held for the holding period Tk, the process can proceed to the following third step in a state where the formation of the film 25 is substantially completed. That is, a battery having a low battery resistance can be manufactured within a short period of time, in which the thin film 25, which can prevent the oxidative decomposition of the nonaqueous solvent, is more appropriately formed on the particle surfaces 24n of the positive electrode active material particles 24.

In this case, it can be seen from the above results that, for example, in the batteries (Comparative Example 3 and Examples 1 and 3 to 5) in which the lithium phosphate particles (LPO) having an average particle size D50 of 3.0 µm was used, the holding period Tk is preferably 50 minutes or longer.

Figure 11:
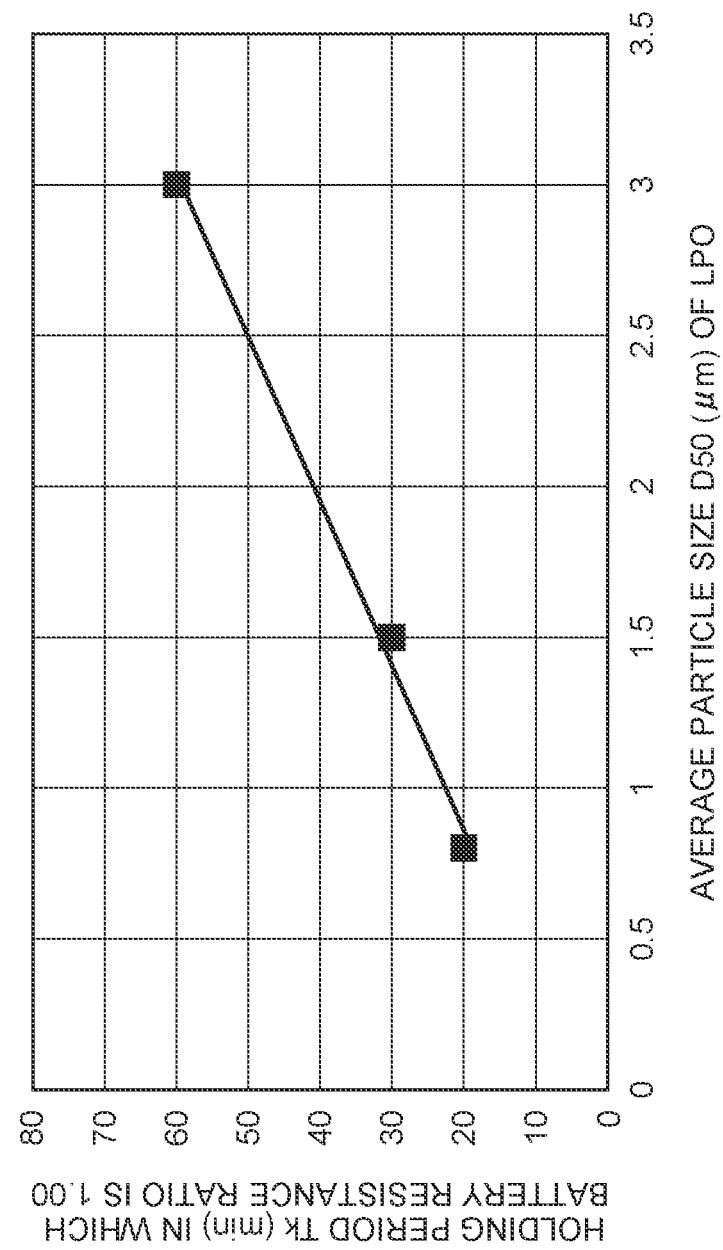
FIG. 11 is a graph showing a relationship between an average particle size of a metal phosphate and a holding period in which a battery resistance ratio is 1.00.

Next, a relationship between the holding period Tk and the average particle size D50 of the lithium phosphate particles 28 added to the positive electrode active material layer 23 will be discussed (refer to Table 2 and FIG. 11). First, among the batteries (Comparative Example 3 and Examples 1 and 3 to 5) in which the lithium phosphate particles 28 having an average particle size D50 of 3.0 µm was used, the holding period Tk of the battery according to Example 1 in which the battery resistance ratio was 1.00 (which was the same as that of the battery according to Comparative Example 6) was 60 minutes. Among the batteries (Comparative Example 4 and Examples 6 to 9) in which the lithium phosphate particles 28 having an average particle size D50 of 1.5 µm was used, the holding period Tk of Example 8 was 30 minutes. Further, among the batteries (Comparative Example 5 and Examples 10 to 13) in which the lithium phosphate particles 28 having an average particle size D50 of 0.8 µm was used, the holding period Tk of Example 11 was 20 minutes. Regarding the batteries, a relationship between the average particle size D50 of the lithium phosphate particles 28 and the holding period Tk, in which the battery resistance ratio was 1.00, is expressed in a graph, and this graph is shown in FIG. 11. That is, the holding period Tk, which is required to obtain the same battery resistance (battery resistance ratio: 1.00) as that of the battery according to Comparative Example 6 which was initially charged by CC charging at a low charging rate of 0.33 C, has a strong correlation, specifically, a linear relation with the average particle size D50 of the lithium phosphate particles 28. As the average particle size D50 of the lithium phosphate particles 28 decreases, the holding period Tk can be reduced. In particular, in a case where the average particle size D50 of the lithium phosphate particles 28 is 1.5 µm or less, the time required for the initial charging can be reduced, for example, the holding period Tk can be made to be 30 minutes or shorter. Assuming that the addition amount is the same, as the average particle size D50 decreases, the number or total surface area of the lithium phosphate particles 28 increases. Therefore, a reaction with the produced hydrogen fluoride (HF) is likely to occur, and it is presumed that the film 25 can be formed within a relatively short period of time.

In this way, in the initial charging step of the method of manufacturing the battery 1, first, the inter-terminal voltage Vt is held at the first voltage Vh, which is within the lower decomposition range Ad, for the predetermined holding period Tk in the second step after the first step. Next, the battery 1 is charged to the second voltage Ve in the third step. Therefore, in the second step, the nonaqueous electrolytic solution 40 is oxidized and decomposed while holding the inter-terminal voltage Vt at the first voltage Vh (Vt=Vh). However, the first voltage Vh is in a low voltage range of the lower decomposition range Ad although it is in a range where the nonaqueous electrolytic solution 40 is oxidized and decomposed. Therefore, the nonaqueous electrolytic solution 40 is slowly oxidized and decomposed, the thickness of the film 25 containing fluorine and phosphorus formed on the particle surfaces 24n of the positive electrode active material particles 24 can be made thin, and the battery resistance can be reduced to be low.

Second Embodiment

Next, a second embodiment of the invention will be described. In the above-described first embodiment, in the first step S1 included in the initial charging step of the battery 1, CC charging is performed at a charging rate of 3.0 C until the inter-terminal voltage Vt reaches the first voltage Vh (Vt=Vh=4.1 V). Next, in the second step S2, CV charging is performed for the predetermined holding period Tk. Next, in the third step S3, CC charging is performed at a charging rate of 3.0 C until the inter-terminal voltage Vt reaches the second voltage Ve (Vt=Ve=4.9 V).

Figure 12:
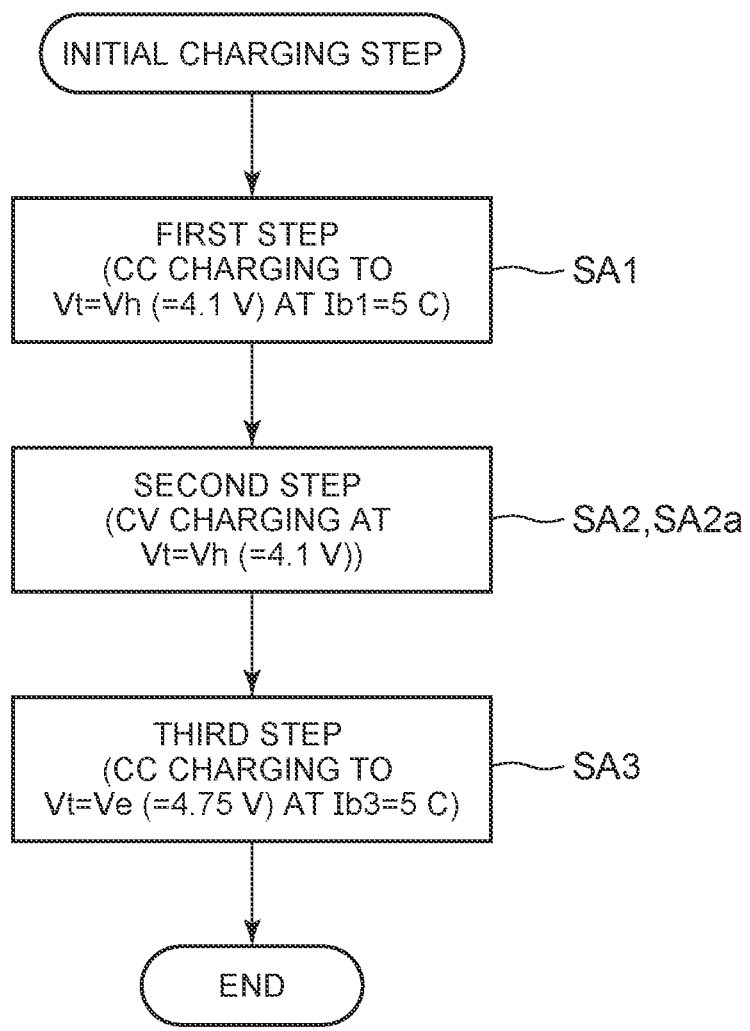
FIG. 12 is a flowchart showing the procedure of each step included in an initial charging step according to the second embodiment and the modification embodiment.

On the other hand, In the above-described second embodiment (the same shall be applied to the modification embodiment), in a first step SA1 included in the initial charging step of the battery 1, CC charging is performed until the inter-terminal voltage Vt reaches the first voltage Vh (Vt=Vh=4.1 V) as in the first embodiment (refer to FIG. 12). However, the second embodiment is different from the first embodiment, in that the charging rate is changed to 5.0 C (charge current Ib=5.0 C). Next, in a third step SA3, as in the case of the first embodiment, CC charging is performed until the inter-terminal voltage Vt reaches the second voltage Ve (Vt=Ve=4.75 V). However, the second embodiment is different from the first embodiment, in that the charging rate is changed to 5.0 C (charge current Ib=5.0 C). The second embodiment is also different from the first embodiment, in that the second voltage Ve is changed to 4.75 V, that is, CC charging is performed until the inter-terminal voltage Vt reaches the second voltage Ve of 4.75 V. Further, the second embodiment is also different from the first embodiment, in that the holding period Tk is defined in a second step SA2. CV charging of holding the inter-terminal voltage Vt at the first voltage Vh (=4.1 V) is performed until the charge current Ib flowing through the battery 1 reaches a predetermined cut-off current value Ibc. In the second embodiment, the cut-off current value Ibc is 0.05 C. Hereinafter, different configurations of the second embodiment from the first embodiment will be mainly described, and the same configurations of the second embodiment as those of the first embodiment will not repeated or will be simplified.

In the second embodiment, the same battery 1 as that of the first embodiment is used. In the second embodiment, the method of manufacturing the battery 1 is also the same as in the first embodiment, except for the initial charging step described below. However, as the lithium phosphate particles 28 added to the positive electrode active material layer 23, particles having an average particle size D50 of 3.0 µm (alternatively, 1.5 µm or 0.8 µm) are used in the first embodiment, and particles having an average particle size D50 of 1.0 µm are used in the second embodiment. From this point of view, the second embodiment is different from the first embodiment.

Figure 13:
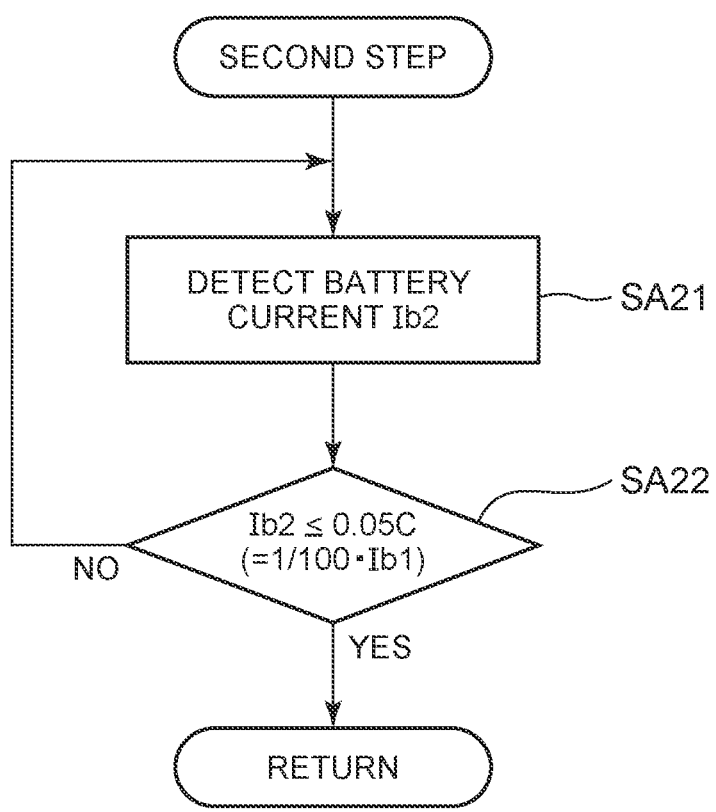
FIG. 13 is a flowchart showing the procedure of a second step included in the initial charging step according to the second embodiment.
Figure 14:
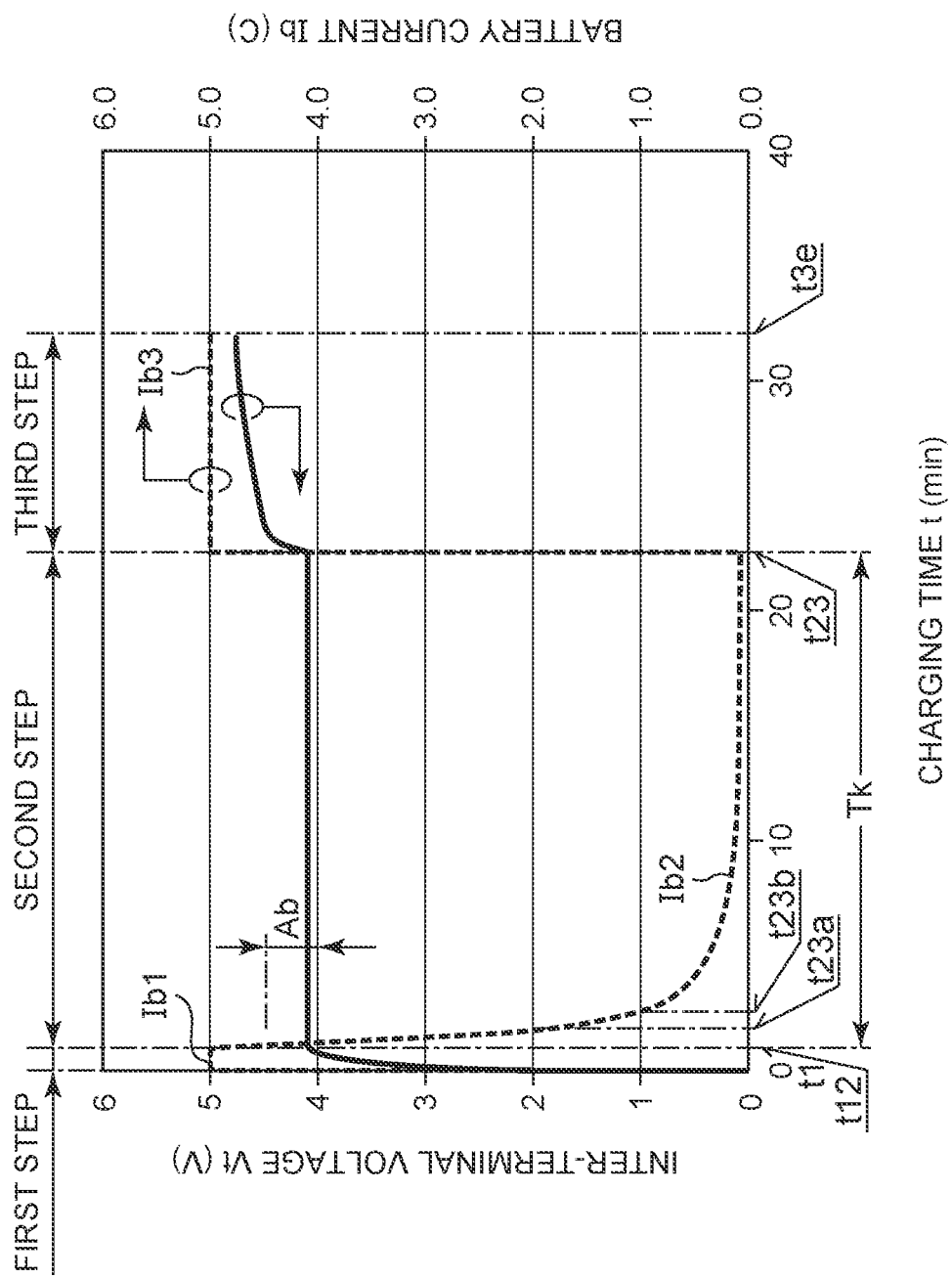
FIG. 14 is a graph showing a relationship between a charging time t, an inter-terminal voltage Vt of a battery, and a charge current Ib in the initial charging step according to the second embodiment and the modification embodiment.

Next, the initial charging step included in the method of manufacturing the battery 1 according to the second embodiment will be described with reference to FIGS. 12 to 15. In the initial charging step, first, the battery 1 is connected to a CC-CV charging-discharging device (not shown). Next, as shown in FIGS. 12 and 14, after a start time t0, the battery 1 is charged by CC charging at a charging rate of 5.0 C (charge current Ib1=5.0 C) such that the inter-terminal voltage Vt is increased to 4.1 V (first voltage Vh) (first step SA1). A charge current Ib1(=5.0 C) at an end stage of the first step (1-2 switching time t12 which is the timing at which the inter-terminal voltage Vt is Vh (=4.1 V)) is set as an end current value. However, in the second embodiment, constant-current charging is performed in the first step. Therefore, as described above, the end current value is equal to the charge current Ib 1 in the first step. As shown in FIG. 14, in the second embodiment, the period of the first step SA1 (t0 to t12) is about 1 minute. Immediately after the start time t0 of the CC charging in the first step SA1, the inter-terminal voltage Vt rapidly increases to about 3 V, and then the inter-terminal voltage Vt reaches the first voltage Vh (=4.1 V) in about 1 minute.

Next, in the second step (SA2), CV charging of charging the battery 1 while holding the inter-terminal voltage Vt (=Vh=4.1 V) is performed. Specifically, as shown in FIG. 13, after the 1-2 switching time t12, a charge current Ib2 is detected in Step SA21, and whether or not the charge current Ib2 is the cut-off current value Ibc of 0.05 C or lower is determined in Step SA 22. Here, in a case where "No" is determined, that is, the charge current Ib2 is higher than 0.05 C (Ib2>0.05 C), the process returns to Step SA21. On the other hand, in a case where "YES" is determined, that is, the charge current Ib2 is 0.05 C or lower (Ib2≤0.05 C) (this timing will be referred to as "2-3 switching time t23") in Step SA22, the process proceeds to the third step SA3 of FIG. 12.

In the second embodiment, the period of the second step SA2 (t12 to t23) is about 21 minutes. Immediately after the start of CV charging in the second step SA2, the charge current Ib2 rapidly decreases from the end current value Ib 1. Next, the charge current Ib2 gradually decreases and then approaches 0. This curve has a shape similar to a graph expressed by $y=1-e^x$ as shown in FIG. 14. The reason for this is presumed to be as follows. At the beginning of the second step SA2, by holding the inter-terminal voltage Vt at the first voltage Vh (=4.1 V) which is in the lower decomposition range Ad (4.0 V to 4.4 V), the nonaqueous electrolytic solution 40 is continuously oxidized and decomposed, and a high current flows as a decomposition current. However, it is presumed that the lithium phosphate particles 28 contained in the positive electrode active material layer 23 are consumed over time, the film 25 is formed, and the oxidative decomposition of the nonaqueous electrolytic solution 40 is prevented; as a result, the charge current Ib2 gradually decreases.

Next, in the third step SA3, as shown in FIG. 12, the battery 1 is charged by CC charging at a charging rate of 5.0 C (charge current Ib3=5.0 C). Once the inter-terminal voltage Vt reaches 4.75 V (second voltage Ve), the initial charging step ends. This timing is set as an end time t3c. In the second embodiment, the period of the third step SA3 (t23 to t3e) is about 10 minutes. Accordingly, the initial charging step according to the second embodiment can be finished within about 32 minutes which is the total period of time of the first to third steps (first step: 1 minute, second step: 21 minutes, and third step: 10 minutes).

In the second step SA2 according to the second embodiment, the inter-terminal voltage Vt of the battery 1 is held at the first voltage Vh (=4.1 V). However, due to a variation in individual batteries 1, the speed of forming a film on the particle surfaces 24n of positive electrode active material particles 24 varies (refer to FIG. 4). Therefore, in a case where the period of holding the first voltage Vh (t12 to t23) is the same, that is, in a case where the holding period Tk is defined as in the first embodiment, for example, the thickness of the film 25 formed on the particle surfaces 24n of the positive electrode active material particles 24 varies, and a variation may be generated, for example, in the battery resistance. Therefore, in order to obtain the film 25 having an appropriate thickness for all the batteries 1, it is necessary that the holding period Tk is set to be long according to that of a battery in which the film forming rate is low. In a case where the holding period Tk is defined to be long according to the battery in which the film forming rate is low, the holding period Tk may be excessively long in some batteries 1. On the other hand, in the above-manufacturing method according to the second embodiment, in the second step SA2, the first voltage Vh is held until the charge current Ib2 reaches the cut-off current value Ibc or lower (Ib2≤Ibc). Therefore, even when there is a variation in the batteries 1, the film 25, which has the same thickness as that in a case where the holding period Tk is defined according to the battery in which the film forming rate is low, can be formed on the particle surfaces 24n of the positive electrode active material particles 24 of each of the batteries 1 within the shortest period of time. Therefore, in a case where the initial charging step is sequentially performed on a number of batteries 1, the number of steps can be reduced as a whole, and a variation in the thickness of the film 25 in each of the batteries, consequently, a variation in battery resistance can be reduced.

Next, regarding each of the batteries 1, the initial charging step was finished after changing the cut-off current value Ibc in the initial charging step to five values including 2.0 C, 0.5 C, 0.1 C, 0.05 C, and 0.02 C. Regarding each of the batteries 1, the battery resistance (IV resistance) was measured using the same method as in the first embodiment. Further, a battery resistance ratio Rr of each of the batteries was obtained with respect to the battery resistance (=1.00) of a battery in which the second step SA2 was not provided (in other words, the battery 1 which was charged by CC charging at a charging rate of 5.0 C) (refer to FIG. 15).

Figure 15:
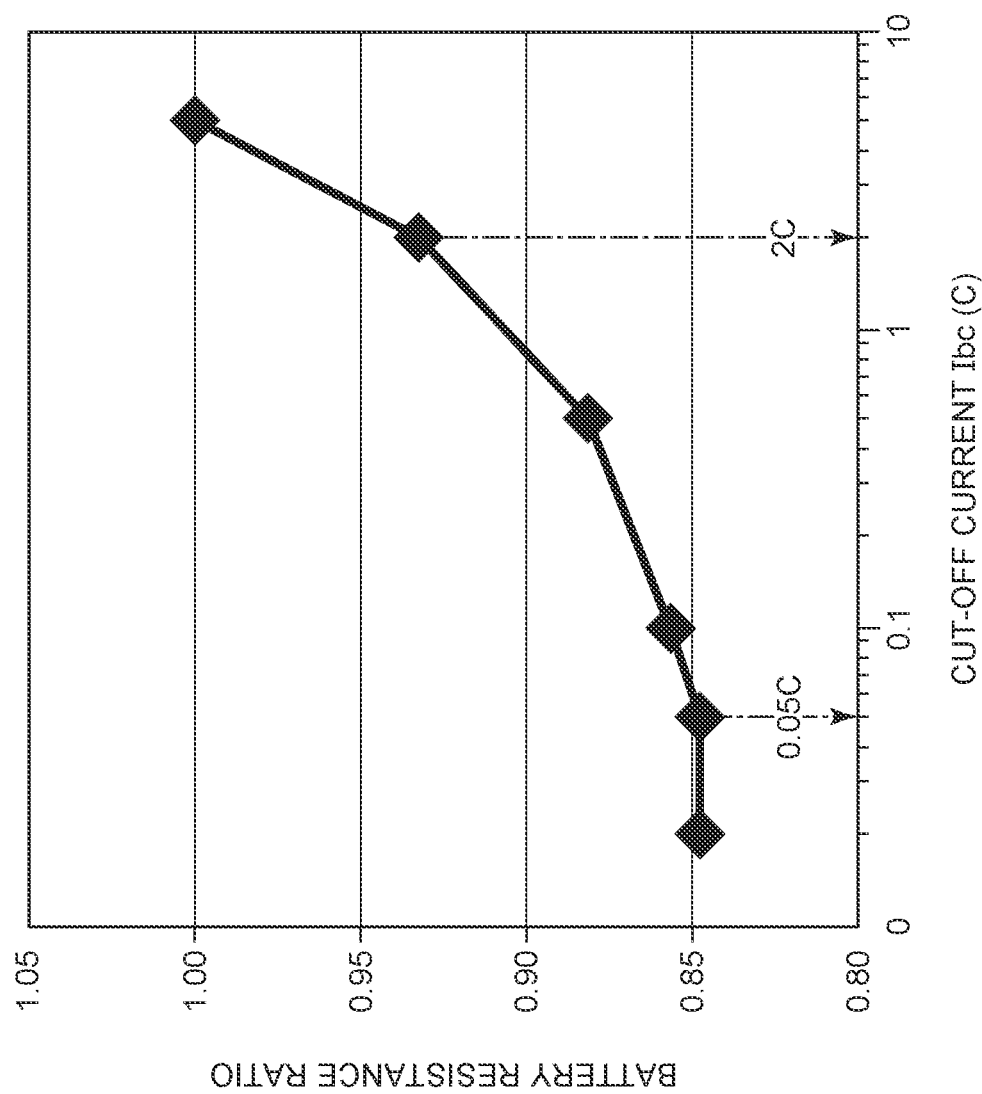
FIG. 15 is a graph showing a relationship between a battery resistance ratio and a cut-off current value Ibc of the second step included in the initial charging step according to the second embodiment and the modification embodiment.

According to the graph of FIG. 15, it can be seen that, as the cut-off current value Ibc decreases by providing the second step, the battery resistance ratio Rr decreases with respect to the battery (Rr=1.00) in which the initial charging step was performed by CC charging at a charging rate of 5.0 C. For example, it can be seen that, when Ibc is set as 2.0 C, the battery resistance ratio Rr is 93%, and the battery resistance can be reduced by about 7%. It can be seen that, when Ibc is set as 1.0 C, the battery resistance ratio Rr is 90%, and the battery resistance can be reduced by about 10%. It can be seen that, when Ibc is set as 0.5 C, the battery resistance ratio Rr is 88%, and the battery resistance can be reduced by about 12%. Further, it can be seen that, when Ibc is set as 0.05 C, the battery resistance ratio Rr is 84.5%, and the battery resistance can be reduced by about 15%.

However, in a case where the cut-off current value is set to be lower than 0.05 C (for example, Ibc=0.02 C), the battery resistance ratio Rr does not decrease as compared to a case where Ibc is set as 0.05 C. That is, it can be seen that, even when the cut-off current value Ibc is set as to be lower than 0.05 C, the battery resistance cannot be further reduced. The reason for this is presumed to be that, during the formation of the film 25, substantially the total amount of the lithium phosphate particles 28 contained in the positive electrode active material layer 23 are consumed in a stage where the charge current Ib is 0.05 C.

In the manufacturing method according to the second embodiment, the end current value Ib1 of the first step SA1 is 5.0 C which is 1 C or higher, whereas the second step SA2 is performed until the cut-off current value Ibc is 0.05 C which is sufficiently lower (1/100) than the end current value Ib1. By performing the second step until the cut-off current value is 0.05 C, the battery resistance is substantially the same as that in a case where the cut-off current value is further reduced from 0.05 C (for example, in a case where the cut-off current value is 0.02 C). Accordingly, by setting the cut-off current value Ibc as 0.05 C, substantially the total amount of the film 25 containing fluorine and phosphorus can be formed on the particle surfaces 24n of the positive electrode active material particles 24 in the second step SA2 within the shortest period of time. In addition, in the second embodiment, the high-quality film 25 can be formed, and the battery resistance can be reduced (specifically, for example, by about 15%) as compared to a case where the second step SA2 is not provided.

Modification Embodiment

In the above-described second embodiment, the cut-off current value Ibc in the second step SA2 (Step SA22) is 0.05 C. However, although the effect of reducing the battery resistance is reduced, the cut-off current value Ibc may be further increased from 0.05 C in order to further reduce the period of the second step SA2. That is, the modification embodiment is different from the second embodiment, in that the cut-off current value Ibc is set as 2.0 C, and other configurations are the same as those in the second embodiment.

Next, the initial charging step included in the method of manufacturing the battery 1 according to the modification embodiment will be described with reference to FIGS. 12 and 14 to 16. First, in the first step (SA1), as in the case of the first embodiment, in a period from the start time t0 to the 1-2 switching time t12, the battery 1 is charged by CC charging at a charging rate of 5.0 C (charge current Ib1=5.0 C) such that the inter-terminal voltage Vt is increased to 4.1 V (first voltage Vh). The end current value is equal to the charge current Ib1 of 5.0 C.

Figure 16:
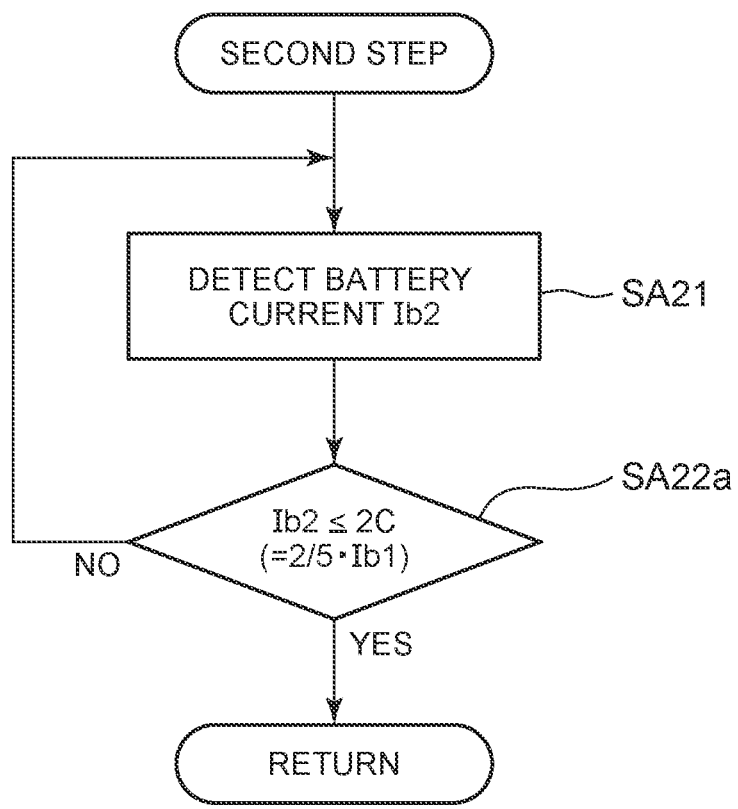
FIG. 16 is a flowchart showing the procedure of the second step included in the initial charging step according to the modification embodiment.

Next, in a second step (SA2a), as in the case of the first and second embodiments, CV charging of charging the battery 1 while holding the inter-terminal voltage Vt (=Vh=4.1 V) is performed. Specifically, as shown in FIG. 16, after the 1-2 switching time t12, the charge current Ib2 in Step SA21 is detected. Next, in Step SA22a, the cut-off current value Ibc is set as 2.0 C which is higher than that in the second embodiment (Ibc=0.05 C), and whether or not the charge current Ib2 is 2.0 C or lower is determined. Here, in a case where "No" is determined, that is, the charge current Ib2 is higher than 2.0 C (Ib2>2.0 C), the process returns to Step SA21. On the other hand, in a case where "YES" is determined, that is, the charge current Ib2 is 2.0 C or lower (Ib2≤2.0 C) (this timing will be referred to as "2-3 switching time t23a"; refer to FIG. 14) in Step SA22a, the process proceeds to the third step SA3 of FIG. 12. In the modification embodiment, the period of the second step SA2a (t12 to t23a) is about 1 minute. In the modification embodiment, the period from t23a to t23 is not present in FIG. 14.

Next, in the third step SA3, as in the case of the second embodiment, as shown in FIG. 12, the battery 1 is charged by CC charging at a charging rate of 5.0 C. Once the inter-terminal voltage Vt reaches 4.75 V (second voltage Ve), the initial charging step ends. In the modification embodiment, the period of the third step SA3 (t23 to t3e) is also about 10 minutes.

Consequently, the initial charging step according to the modification embodiment can be finished within about 12 minutes which is the total period of time of the first to third steps (first step: 1 minute, second step: 1 minute, and third step: 10 minutes) and is much shorter than that of the second embodiment. As shown in FIG. 15, in the battery 1 according to the modification embodiment in which the cut-off current value Ibc is set as 2.0 C, the battery resistance can be reduced by about 7% as compared to a case where the second step is not provided.

In the modification embodiment, in Step SA22a, the cut-off current value Ibc is set as 2.0 C. However, for example, the second step may be performed by setting the cut-off current value Ibc as 1.0 C. In this case, the period of the second step (t12 to t23b) is about 2 minutes. The 2-3 switching time t23b is the timing at which the charge current Ib2 reaches 1.0 C or lower (Ib2≤1.0 C) (refer to FIG. 14). In this case, the period from t23b to t23 is not present in FIG. 14. In a case where the cut-off current value Ibc is set as 1.0 C, the initial charging step (first to third steps) can be finished in about 13 minutes (first step: 1 minute, second step: 2 minutes, and third step: 10 minutes). On the other hand, by setting the cut-off current value Ibc as 1.0 C, the battery resistance can be reduced by about 10% as compared to a case where the second step is not provided.

In the above-described method of manufacturing the battery 1 according to the second embodiment and the modification embodiment, the lithium phosphate particles 28 contained in the positive electrode active material layer 23 have an average particle size D50 of 1.5 μm or less. Therefore, in a case where the particles having an average particle size D50 of 1.5 μm or less are used, assuming that the addition amount is the same, the number or total surface area of particles increases as compared to a case where particles having an average particle size D50 of more than 1.5 μm are used. As a result, a reaction with the produced hydrofluoric acid is likely to occur, and the film 25 can be formed within a short period of time, and the time required for the second step SA2 and SA2a, consequently, the time required for the initial charging step can be reduced.

In the battery 1 which is manufactured using the manufacturing method according to the first embodiment, the second embodiment, and the modification embodiment, the positive electrode potential Ep is 4.5 V (vs. Li/Li+) or higher in at least a portion of a SOC range of 0% to 100%. Therefore, in a case where the SOC of the battery 1 is high, the nonaqueous electrolytic solution 40 is likely to be oxidized and decomposed to produce hydrogen ions on the particle surfaces 24n of the positive electrode active material particles 24. Further, the nonaqueous electrolytic solution 40 contains the compound 41 containing fluorine. Therefore, hydrofluoric acid is likely to be produced from the hydrogen ions and fluorine. However, in the method of manufacturing the battery 1 according to the first embodiment, the second embodiment, and the modification embodiment, the film 25 containing fluorine and phosphorus is formed on the particle surfaces 24n of the positive electrode active material particles 24 in the second step S2, SA2, or SA2a of the initial charging step. Therefore, after the initial charging step, the oxidative decomposition of the nonaqueous electrolytic solution 40 can be appropriately prevented.

Further, in the manufacturing method according to the first embodiment, the second embodiment, and the modification embodiment, in the first step S1 or SA1 and the third step S3 or SA3, the battery is charged by CC charging at a current value Ib1 or Ib3 of 3.0 C or 5.0 C. As a result, the time required for the first step and the third step can be reduced, and the initial charging step can be performed within a shorter period of time. In all of the first embodiment, the second embodiment, and the modification embodiment, the charge current Ib1 in the first step is the same as the charge current Ib3 in the third step. However, the charge current Ib1 may be different from the charge current Ib3. For example, the charge current Ib1 may be set as 3.0 C, and the charge current Ib3 may be set as 5.0 C. In particular, it is preferable that the charge current Ib1 is equal to or lower than the charge current Ib3. The reason for this is that, as can be easily understood from FIG. 14, the contribution of the charge current Ib3 to the reduction in the charging time t obtained by increasing the charge current is larger than that of the charge current Ib 1. When the charge current Ib1 decreases, the time of the first step increases. However, there is an advantageous effect in that the amount of the film 25 formed in the first step before the second step can be reduced.

Hereinabove, the invention has been described using the first embodiment, the second embodiment, and the modification embodiment. However, the invention is not limited to the first embodiment, the second embodiment, and the modification embodiment, and appropriate modifications can be made within a range not departing from the scope of the invention. For example, in the above-described battery 1 and the like, the lithium phosphate particles 28 are used as the metal phosphate particles, but the invention is not limited thereto. For example, particles of another metal phosphate such as sodium phosphate, potassium phosphate, magnesium phosphate, or calcium phosphate may be added to the positive electrode active material layer. Instead of or in addition to the metal phosphate particles such as the lithium phosphate particles 28, metal pyrophosphate particles such as lithium pyrophosphate particles, sodium pyrophosphate particles, magnesium pyrophosphate particles, or calcium pyrophosphate particles may be added to the positive electrode active material layer.

What is claimed is:

1. A method of manufacturing a lithium ion secondary battery, the lithium ion secondary battery including a positive electrode that includes a positive electrode active material layer containing positive electrode active material particles, a negative electrode, and a nonaqueous electrolytic solution that contains a compound containing fluorine, the positive electrode active material particles having a surface on which a film containing fluorine and phosphorus is formed, the positive electrode active material layer including particles of at least one of a metal phosphate and a metal pyrophosphate, and the method comprising:
   initially charging the lithium ion secondary battery, the initial charging including:
   a first step of charging the lithium ion secondary battery such that a voltage of the lithium ion secondary battery is increased to a first voltage which is in a lower decomposition range of the nonaqueous electrolytic solution;
   a second step of applying a voltage to the lithium ion secondary battery so as to hold the voltage of the lithium ion secondary battery at the first voltage for a predetermined holding period in a range of 10 to 90 minutes; and
   a third step of charging the lithium ion secondary battery to a second voltage, which is higher than the first voltage, after the second step,
   wherein negative electrode active material of the negative electrode includes graphite while the initial charging occurs.

2. The method according to claim 1, wherein
in the third step, the lithium ion secondary battery is charged at a charge current which is higher than 1 C.

3. The method according to claim 1, wherein
the predetermined holding period satisfies Rn=0.98Re to 1.02Re, in which Rn represents a battery resistance of a battery manufactured by performing the second step for the predetermined holding period and then performing the third step, and Re represents a battery resistance of a holding period extended battery manufactured by holding the first voltage not for the predetermined holding period but for an extended holding period, which is 1.5 times the predetermined holding period, and performing the third step.

4. The method according to claim 1, wherein
the predetermined holding period satisfies Rn=0.99Re to 1.01Re, in which Rn represents a battery resistance of a battery manufactured by performing the second step for the predetermined holding period and then performing the third step, and Re represents a battery resistance of a holding period extended battery manufactured by holding the first voltage not for the predetermined holding period but for an extended holding period, which is 1.5 times the predetermined holding period, and performing the third step.

5. The method according to claim 1, wherein
in the second step, the first voltage is held until a charge current of the lithium ion secondary battery becomes a predetermined cut-off current value or lower.

6. The method according to claim 5, wherein
the predetermined cut-off current value is $2/5$ of an end current value at an end stage of the first step.

7. The method according to claim 5, wherein an end current value at an end stage of the first step is 1 C or higher, and the predetermined cut-off current value is 0.05 C.

8. The method according to claim 1, wherein
the particles of at least one of the metal phosphate and the metal pyrophosphate contained in the positive electrode active material layer have an average particle size of 1.5 μm or less.

9. The method according to claim 1, wherein
in the first step and the third step, the lithium ion secondary battery is charged by constant-current charging at a predetermined current value of 3 C or higher.

10. The method according to claim 1, wherein
the first step includes charging the lithium ion secondary battery by constant-current charging at a first predetermined current value,
the third step includes charging the lithium ion secondary battery by constant-current charging at a second predetermined current value, and
the first predetermined current value is the second predetermined current value or lower.

11. A method of initially charging a lithium ion secondary battery, the lithium ion secondary battery including a positive electrode that includes a positive electrode active material layer containing positive electrode active material particles, a negative electrode, and a nonaqueous electrolytic solution that contains a compound containing fluorine, the positive electrode active material particles having a surface on which a film containing fluorine and phosphorus is formed, the positive electrode active material layer including particles of at least one of a metal phosphate and a metal pyrophosphate, and the method comprising:
   a first step of charging the lithium ion secondary battery such that a voltage of the lithium ion secondary battery is increased to a first voltage which is in a lower decomposition range of the nonaqueous electrolytic solution;
   a second step of applying a voltage to the lithium ion secondary battery so as to hold the voltage of the lithium ion secondary battery at the first voltage for a predetermined holding period in a range of 10 to 90 minutes; and
   a third step of charging the lithium ion secondary battery to a second voltage, which is higher than the first voltage, after the second step, wherein negative electrode active material of the negative electrode includes graphite while the initial charging occurs.

* * * * *